（12） United States Patent
Cao et al.

(10) Patent No.: US 11,659,551 B2
(45) Date of Patent: May 23, 2023

(54) HIGHER LAYER ASSISTED RESOURCE CONFIGURATION FOR SIDELINK CONFIGURED GRANT TRANSMISSION

(71) Applicant: Huawei Technologies Co., Ltd., Shenzhen (CN)

(72) Inventors: Yu Cao, Kanata (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/834,237

(22) Filed: Mar. 30, 2020

(65) Prior Publication Data

US 2020/0322939 A1 Oct. 8, 2020

Related U.S. Application Data

(60) Provisional application No. 62/828,202, filed on Apr. 2, 2019.

(51) Int. Cl.
*H04W 72/04* (2023.01)
*H04W 72/02* (2009.01)
*H04W 92/18* (2009.01)

(52) U.S. Cl.
CPC ....... *H04W 72/0406* (2013.01); *H04W 72/02* (2013.01); *H04W 92/18* (2013.01)

(58) Field of Classification Search
CPC .. H04W 72/02; H04W 72/0406; H04W 92/18
See application file for complete search history.

(56) References Cited

U.S. PATENT DOCUMENTS

2017/0353819 A1* 12/2017 Yin .................. H04L 47/30
2018/0199359 A1   7/2018 Cao et al.
(Continued)

FOREIGN PATENT DOCUMENTS

CN    105515721 A    4/2016
CN    105813204 A    7/2016
(Continued)

OTHER PUBLICATIONS

"Feature lead summary for AI 7.2.4.3: Uu-based sidelink resource allocation/configuration", 3GPP TSG RAN WG1 Meeting AH-1901, Taipei, Jan. 21-25, 2019, 11 pages.
(Continued)

*Primary Examiner* — Rhonda L Murphy
(74) *Attorney, Agent, or Firm* — Slater Matsil, LLP

(57) ABSTRACT

Systems and methods for sidelink configuration are provided. A transmitting user equipment (UE) transmits configuration parameters relating to a sidelink transmission between the UE and a second UE via higher-layer signalling and then transmits the sidelink transmission to the second UE. The higher layer signalling is a layer above the sidelink transmission. The parameters may include feedback channel parameters or parameters for sidelink reference signal transmission by the second UE. The parameters may be selected by the transmitting UE, or they may be received initially from the network. The parameters may be part of a sidelink configured grant configuration (SL CG) signalled to the second UE. The sidelink transmission may be a configured-grant transmission to the second UE according to the SL CG configuration. The higher layer signalling may be PC5 signalling or RRC signaling.

22 Claims, 16 Drawing Sheets

(56) References Cited

U.S. PATENT DOCUMENTS

| | | | |
|---|---|---|---|
| 2019/0342910 A1 | 7/2019 | Cao et al. | |
| 2020/0084811 A1 | 3/2020 | Uchiyama et al. | |
| 2020/0229145 A1* | 7/2020 | Kang | H04W 72/02 |
| 2020/0305174 A1* | 9/2020 | Ganesan | H04W 72/12 |
| 2020/0374898 A1* | 11/2020 | Lin | H04W 76/14 |
| 2021/0092688 A1* | 3/2021 | Guo | H04B 17/327 |
| 2021/0168772 A1* | 6/2021 | Babaei | H04W 72/042 |
| 2022/0174655 A1* | 6/2022 | Tsai | H04W 48/16 |

FOREIGN PATENT DOCUMENTS

| | | |
|---|---|---|
| CN | 106063352 A | 10/2016 |
| CN | 106538022 A | 3/2017 |
| CN | 106793092 A | 5/2017 |
| CN | 106797631 A | 5/2017 |
| CN | 107211430 A | 9/2017 |
| CN | 107534828 A | 1/2018 |
| CN | 109479292 A | 3/2019 |
| WO | 2016161709 A1 | 10/2016 |
| WO | 2016163972 A1 | 10/2016 |
| WO | 2017128275 A1 | 8/2017 |
| WO | 2018039079 A1 | 3/2018 |
| WO | 2018064477 A1 | 4/2018 |
| WO | 2018160045 A1 | 9/2018 |
| WO | 2018173523 A1 | 9/2018 |
| WO | 2019028276 A1 | 2/2019 |
| WO | 2019033407 A1 | 2/2019 |

OTHER PUBLICATIONS

OPPO, "Discussion on PC5-RRC of unicast for NR-V2X", 3GPP TSG-RAN WG2 Meeting #105, R2-1900172, Mar. 1, 2019 (Mar. 1, 2019), part 2, 6 pages.

Qualcomm Incorporated, On the coordination of PC5-RRC and PC5-S, 3GPP TSG-RAN WG2 Meeting #105, R2-1901722, Mar. 1, 2019 (Mar. 1, 2019), whole document, 4 pages.

Media Tek Inc., "Uu-based enhancements for sidelink configuration", 3GPP TSG RAN1 WG1 Meeting #95, R1-1812369, Nov. 12-16, 2018, 6 Pages, Spokane.

OPPO, "Discussion on PC5-RRC of unicast for NR-V2X", 3GPP TSG-RAN WG2 Meeting #105, R2-1900172, Revision of R2-1816339, Feb. 25-Mar. 1, 2019, 6 Pages, Athens, Greece.

ZTE, "Discussion resource pool configuration in NR V2X", 3GPP TSG-RAN WG2#103bis, R2-1814176, Oct. 8-12, 2018, 4 Pages, Chengdu, China.

ZTE, "Initial consideration on NR V2X resource allocation", 3GPP TSG-RAN WG2#103bis, R2-1814168, Oct. 8-12, 2018, 7 Pages, Chengdu, China.

OPPO, "Discussion on left issues of group-east for NR-V2X", 3GPP TSG-RAN WG2 Meeting #105, R2-1900177, Revision of R2-1816339, Feb. 25-Mar. 1, 2019, 3 Pages, Athens, Greece.

\* cited by examiner

HIGHER LAYER ASSISTED RESOURCE CONFIGURATION FOR SIDELINK CONFIGURED GRANT TRANSMISSION

This application claims the benefit of U.S. Provisional Patent Application No. 62/828,202 filed Apr. 2, 2019, which is hereby incorporated by reference in its entirety.

FIELD

The disclosure relates to resource configuration for sidelink configured grant transmission.

BACKGROUND

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and user equipment (UE), such as uplink (UL) and downlink (DL) or a sidelink between UE and UE (SL).

In LTE, a conventional V2X transmission scheme relies on the concept of a transmit resource pool (RP). The conventional LTE V2X transmission scheme includes two transmission modes: mode 3 and mode 4. In mode 3, a base station (BS) schedules time-frequency resources (from the UE's RP) for SL transmission using downlink control information (DCI), either dynamically or semi-persistently. In mode 4, UE selects resources within its transmit RP. UE may also select resources based on previous measurement and sensing results.

In NR, two resource allocation modes for SL V2X transmission are supported. In NR Mode 1, a BS schedules a UE to perform SL transmission. NR SL Mode 1 includes dynamic scheduling and SL configured grant transmission. SL Configured grant transmission includes a Type 1 SL configured grant (CG) transmission where the configured grant is signaled in radio resource control (RRC) signaling and a Type 2 SL configured grant transmission where the resource for configured grant transmission is signaled in a combination of RRC and DCI signaling.

NR's UL grant-free transmission is called "configured grant UL transmission" or "UL transmission without dynamic scheduling." It includes two types. For configured grant Type 1, resource is configured by RRC signaling. For configured grant Type 2, resource is configured by a combination of RRC signaling and DCI signaling.

SL transmission may support three types of communications between UE using SL.
1. Unicast: a communication between a single transmit UE and a single receive UE;
2. Groupcast: a transmit UE sends a SL transmission to a group of UE. The members of the group of UE may be known in advance.
3. Broadcast: a transmit UE broadcasts SL transmissions. All UEs that satisfy some criteria can receive the SL transmission if they can successfully decode the data.
4. HARQ feedback may be supported for unicast and groupcast transmission, but not for broadcast transmission.

SUMMARY

Systems and methods for sidelink configuration are provided. A transmitting user equipment (UE) transmits configuration parameters relating to a sidelink transmission between the UE and a second UE via higher-layer signalling and then transmits the sidelink transmission to the second UE. The higher layer signalling is a layer above the sidelink transmission. The parameters may include feedback channel parameters or parameters for sidelink reference signal transmission by the second UE. The parameters may be selected by the transmitting UE, or they may be received initially from the network. The parameters may be part of a sidelink configured grant configuration (SL CG) signalled to the second UE. The sidelink transmission may be a configured-grant transmission to the second UE according to the SL CG configuration. The higher layer signalling may be PC5 signalling or RRC signalling. Transmitting the configured-grant transmission to the second UE may be done using resources that are not indicated in a sidelink control information from the first UE to the second UE.

According to one aspect of the present disclosure, there is provided a method comprising: transmitting via higher-layer signaling, by a first user equipment (UE) to a second UE, a configuration of at least one parameter relating to a sidelink transmission between the first UE and the second UE, the higher-layer signaling being a layer above the sidelink transmission; and transmitting, by the first UE, the sidelink transmission to the second UE.

Optionally, the at least one parameter comprises a feedback channel parameter.

Optionally, the at least one parameter comprises a parameter for receiving a sidelink reference signal by the second UE.

Optionally, the method further comprises: the first UE selecting the configuration of the at least one parameter.

Optionally, the first UE receiving signalling from a network device indicating the configuration of the at least one parameter.

Optionally, the first UE transmitting at least part of a sidelink configured-grant (CG) configuration to a second UE via the higher-layer signaling, wherein said configuration of at least one parameter is part of the sidelink CG configuration; wherein the first UE transmitting the sidelink transmission comprises transmitting a sidelink CG transmission to the second UE using resources that are not indicated in a sidelink control information from the first UE to the second UE.

Optionally, the higher layer signalling is "PC5" signalling or radio resource control (RRC) signalling.

According to another aspect of the present disclosure, there is provided a method comprising: receiving via higher-layer signalling, by a first UE from a second UE, a configuration of at least one parameter relating to a sidelink transmission between the second UE and the first UE, the higher-layer signalling being a layer above the sidelink transmission; and receiving, by the first UE, the sidelink transmission from the second UE.

Optionally, the at least one parameter comprises receiving feedback channel parameters.

Optionally, the at least one parameter comprises a parameter for transmitting a sidelink reference signal by the first UE.

Optionally, the method further comprises: the first UE receiving at least part of a sidelink configured grant (CG) configuration from the second UE via the higher-layer signaling, wherein said configuration of at least one parameter is part of the sidelink CG configuration; wherein the first UE receiving the sidelink transmission comprises receiving a sidelink CG transmission from the second UE using resources that are not indicated in a sidelink control information from the second UE to the first UE.

Optionally, the higher layer signalling is "PC5" signalling or radio resource control (RRC) signalling.

According to another aspect of the present invention, there is provided a user equipment comprising: a processor and memory; wherein the user equipment (UE) is configured to: transmit via higher-layer signaling to a second UE, a configuration of at least one parameter relating to a sidelink transmission between the UE and the second UE, the higher-layer signaling being a layer above the sidelink transmission; and transmit the sidelink transmission to the second UE.

Optionally, the at least one parameter comprises a feedback channel parameter.

Optionally, the at least one parameter comprises a parameter for receiving a sidelink reference signal by the second UE.

Optionally, the user equipment is further configured to select the configuration of the at least one parameter.

Optionally, the user equipment is further configured to receive signalling from a network device indicating the configuration of the at least one parameter.

Optionally, the user equipment is further configured to transmit at least part of a sidelink configured-grant (CG) configuration to a second UE via the higher-layer signaling, wherein said configuration of at least one parameter is part of the sidelink CG configuration; wherein the UE transmits the sidelink transmission by transmitting a sidelink CG transmission to the second UE using resources that are not indicated in a sidelink control information from the first UE to the second UE.

Optionally, the higher layer signalling is "PC5" signalling or radio resource control (RRC) signalling.

According to another aspect of the present invention, there is provided a user equipment comprising: a processor and memory; wherein the user equipment is configured to: receive via higher-layer signalling, a configuration of at least one parameter relating to a sidelink transmission between a second UE and the UE, the higher-layer signalling being a layer above the sidelink transmission; and receive the sidelink transmission from the second UE.

Optionally, the at least one parameter comprises receiving feedback channel parameters.

Optionally, the at least one parameter comprises a parameter for transmitting a sidelink reference signal by the UE.

Optionally, the user equipment is further configured to receive at least part of a sidelink configured grant (CG) configuration from the second UE via the higher-layer signaling, wherein said configuration of at least one parameter is part of the sidelink CG configuration; wherein the first UE is receives the sidelink transmission by receiving a sidelink CG transmission from the second UE using resources that are not indicated in a sidelink control information from the second UE to the first UE.

Optionally, the higher layer signalling is "PC5" signalling or radio resource control (RRC) signalling.

According to one aspect of the present disclosure, there is provided a method comprising: a first user equipment (UE) obtaining a SL CG configuration; the first UE transmitting at least part of the SL CG configuration to a second UE via higher-layer signaling; the first UE transmitting a first sidelink configured-grant transmission to the second UE according to the SL CG configuration.

Optionally, the method further comprises the first UE transmitting at least one subsequent configured-grant transmission to the second UE according to the SL CG configuration.

Optionally, the UE obtaining the SL CG configuration comprises the first UE receiving the SL CG configuration from a base station via higher layer signaling or via at least one system information block.

Optionally, the UE obtaining the SL CG configuration comprises the first UE selecting the SL CG configuration from a pool of possible SL CG configurations.

Optionally, the UE obtaining the SL CG configuration comprises the first UE determining the SL CG configuration based on a pool of resources.

Optionally, the SL CG configuration is preconfigured in the first UE.

Optionally, wherein the SL CG configuration comprises one of or a combination of two or more of: Time domain resource configuration; Frequency domain resource configuration; Resource pattern or TFRP; Repetition number K; redundancy version (RV) sequence; DMRS configuration; MCS configuration; HARQ related parameters; Power control parameters; Destination ID; Source ID.

Optionally, the transmitted at least part of the SL CG configuration comprises a pool of resources.

Optionally, the first user equipment (UE) obtaining a SL CG configuration comprises the first UE receiving the SL CG configuration from another UE that received the SL CG configuration from a base station.

Optionally, the first UE transmitting at least part of the SL CG configuration to a second UE via higher-layer signaling comprises the first UE transmitting a groupcast transmission of the at least part of the SL CG configuration to a group of UEs including the second UE; and the first UE transmitting a first sidelink configured-grant transmission to the second UE according to the SL CG configuration comprises the first UE transmitting a groupcast sidelink transmission to the second UE and to the other UEs in the group of UEs.

Optionally, the higher layer signaling from the base station comprises RRC signaling; and/or the higher layer used to transmit the SL CG configuration from one UE to another is PC5 RRC signaling.

Optionally, the method further comprises: using higher layer SL signaling to transmit an update to a previous SL CG configuration to another UE.

Optionally, the method further comprises: receiving a downlink control information (DCI) to activate the SL CG configuration.

Optionally, the method further comprises: the first UE transmitting a sidelink control information (SCI) to the second UE to activate the SL CG configuration.

According to another aspect of the present disclosure, there is provided a method comprising: a first user equipment (UE) receiving from a base station a first SL CG configuration for a first sidelink configured-grant transmission by a second UE; the first UE transmitting at least part of the first SL CG configuration to the second UE via higher-layer signaling for the second UE to use in transmitting the first sidelink configured-grant transmission to another UE.

Optionally, the method further comprises: the first user equipment (UE) receiving from a base station a second SL CG configuration for a second sidelink configured-grant transmission by a third UE; the first UE transmitting at least part of the second SL CG configuration to the third UE via higher-layer signaling for the third UE to use in transmitting the second sidelink configured-grant transmission to another UE.

Optionally, a) the first UE transmitting at least part of the first SL CG configuration to the second UE via higher-layer signaling for the second UE to use in transmitting the first sidelink configured-grant transmission to another UE; and b) the first UE transmitting at least part of the second SL CG configuration to the third UE via higher-layer signaling for the third UE to use in transmitting the second sidelink configured-grant transmission to another UE; are performed together by transmitting a group based RRC signaling to a group of UEs that includes at least the first UE and the second UE.

Optionally, the first SL CG configuration specifies a source ID and a destination ID for the first sidelink configured-grant transmission; and the second SL CG configuration specifies a source ID and a destination ID for the second sidelink configured-grant transmission.

According to another aspect of the present disclosure, there is provided a method comprising: a first UE receiving at least part of a SL CG configuration from a second UE via higher-layer signaling; the first UE receiving a first sidelink configured-grant transmission from the second UE according to the SL CG configuration.

Optionally, the method further comprises: the first UE receiving at least one subsequent configured-grant transmission to the second UE according to the SL CG configuration.

Optionally, the SL CG configuration comprises one of or a combination of two or more of: Time domain resource configuration; Frequency domain resource configuration; Resource pattern or TFRP; Repetition number K; redundancy version (RV) sequence; DMRS configuration; MCS configuration; HARQ related parameters; Power control parameters; Destination ID; Source ID.

Optionally, the received at least part of the SL CG configuration comprises a pool of resources.

Optionally, the first UE receiving at least part of a SL CG configuration from a second UE via higher-layer signaling comprises the first UE receiving a groupcast transmission of the at least part of the SL CG configuration to a group of UEs including the first UE; and the first UE receiving a first sidelink configured-grant transmission from the second UE according to the SL CG configuration comprises the first UE receiving a groupcast sidelink transmission from the second UE.

Optionally, the higher layer signaling from the base station comprises RRC signaling; and/or the higher layer used to transmit the SL CG configuration from one UE to another is PC5 RRC signaling.

Optionally, the method further comprises: using higher layer SL signaling to receive an update to a previous SL CG configuration to another UE.

Optionally, the method further comprises: the first UE receiving a sidelink control information (SCI) to the second UE to activate the SL CG configuration.

According to another aspect of the present invention, there is provided a UE comprising: a processor; a memory; at least on antenna wherein the UE is configured to perform the method described herein.

BRIEF DESCRIPTION OF THE DRAWINGS

Embodiments of the disclosure will now be described with reference to the attached drawings in which.

Embodiments of the disclosure will now be described with reference to the attached drawings in which.

DETAILED DESCRIPTION

Figure 1A:
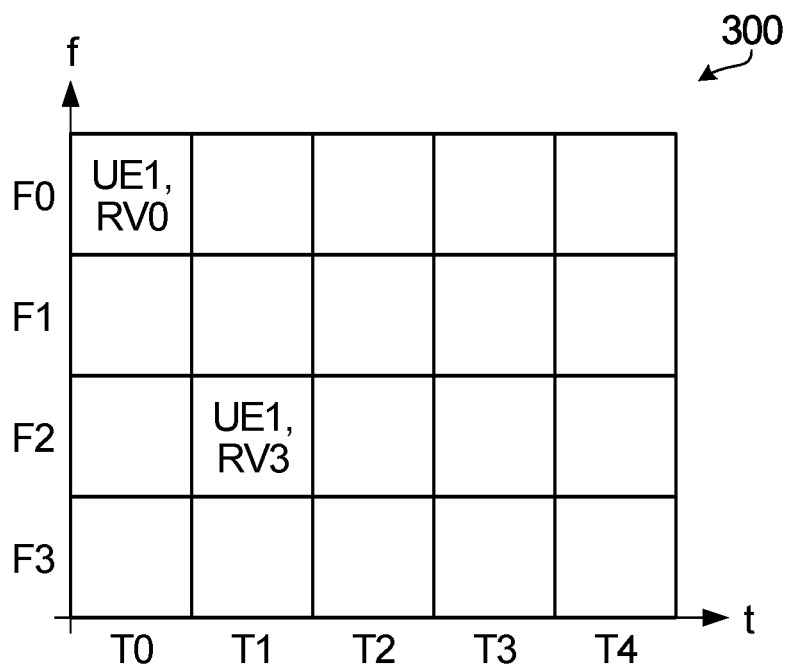
FIG. 1A is a block diagram illustrating an example of a two-dimensional resource configuration for grant-free SL transmission.

In SL configured grant transmission, the SL transmission may not require dynamic signaling. This feature can reduce the overhead and latency of SL configured grant transmission. In the case where the SL data transmission, for example using physical sidelink shared channel (PSSCH) does not have an associated sidelink control information (SCI) or physical sidelink control channel (PSCCH) transmission the receiver UE may not be able to know the resource configuration or parameters used for the SL transmission. Therefore, the receiver UE may not be able to easily decode the SL transmission without additional information indicating the resource and parameters used for the SL configured grant transmission. This situation may also arise when an SCI is present, but the SCI does not contain all the information necessary for the receiving UE to decode the SL transmission.

In NR, there are two SL transmission modes. In mode 1, the BS controls SL transmission. Mode 1 is most suitable for in coverage UE.

Mode 1—dynamic scheduling sub-mode—the network dynamically schedules SL transmissions. In this dynamic scheduling sub-mode, BS may send a DCI to the transmitter UE to schedule the SL transmission. The transmit UE follows the scheduling grant in the DCI and sends a SL transmission to the receive UE or receive UEs.

Mode 1—CG Type 1—also known as grant-free transmission: the configured grant resource is semi-statically configured by RRC signaling (which may include a RRC configured grant). The UE uses the configured resource without dynamic signaling (e.g. DCI) to perform SL transmissions.

Mode 1—CG Type 2: The configured grant resource is configured by RRC signaling and DCI signaling. In type 2 CG, transmit UE may receive some configuration in RRC signaling and then the transmit UE may further receive a DCI activation signal.

In Mode 2 configured grant or GF transmission, the GF resource may be preconfigured or configured by RRC or system information. Mode 2 can be used for both in coverage and out of coverage UEs. In mode 2, a UE determines or selects a resource among a (pre-) configured resource pool.

In Type 1 SL configured grant (CG) configuration, the resource is configured semi-statically or preconfigured without dynamic signaling in DCI. In one variant, the SL data transmission on PSSCH according to CG does not have an associated SCI or PSCCH or there is an associated SCI or PSCCH transmission but it does not include any scheduling information or indication in a SCI. In another variant, a SCI or PSCCH is transmitted along with SL data or PSSCH transmission. The SL CG configuration may be configured within a RP or configured without a RP.

In some embodiments, a SL CG configuration involves indicating a resource from a resource pool that is configured or preconfigured. Alternatively, SL CG configuration involves configuring a resource pool from which the UE can select from. The resource pool configuration may be also used to define a resource pool for other transmission modes or just an independent SL CG configuration.

A resource pool refers to a pool of transmission resources that a UE can use or select from. A resource pool typically includes at least the time and frequency resources. Resource pool can include other transmission resources.

In one example, there are multiple resource pool (RP) configurations, which may be configured per SL bandwidth part (BWP). Each resource pool may be a transmit resource pool or a receive resource pool or a resource pool that can be used for both transmission and reception. For each RP, there may be a SL CG configuration defined within the RP, there may be other transmission modes defined within the RP as well. In another example, there are multiple SL CG configurations, which may be configured per SL BWP. For each SL GF configuration, there may be one or multiple resource pools defined, each resource pool can be a transmit resource pool or receive resource pool. In some embodiment, multiple SL CG configurations may be configured within a resource pool. Each SL CG configuration may include a transmit CG configuration and a receive CG configuration. Alternatively, each SL CG configuration may be either used for transmission or reception. In some scenarios, the resource configuration for each SL GF configuration may not be called a resource pool or within a resource pool, it may be simply a resource configuration.

In some embodiments, a UE is configured with multiple SL CG configurations, which may be defined within multiple SL bandwidth parts (BWPs). SL BWPs may be configured within RRC configuration (UE specific SL BWP), in system information (common SL BWP) or reconfiguration (preconfigured SL BWP). In some embodiments, a UE reuses one or more UL BWPs as SL BWPs. One or multiple resource pools may be defined within a SL BWP and one or multiple SL CG configurations may be defined within a SL BWP.

In some embodiments, a UE may have multiple resource pool configurations and/or multiple SL CG configurations. Multiple transmit and receive resource pool configurations and/or multiple SL CG configurations may be configured per SL-BWP.

In some embodiments, multiple SL CG configurations may be configured within resource pool configurations. In some embodiments, multiple transmit and receive resource pools may be configured within SL CG configurations.

In some embodiments, multiple SL CG configurations may be independent of resource pool configurations.

Each SL GF configuration may include one or more of transmit resource or resource pool and receive resource or resource pool. The configuration can be semi-static or semi-persistently configured, the example of configuration signaling can include RRC, system information block (SIB), preconfigured, or a combination of RRC and SIB.

Each SL CG configuration may include parameters for one or multiple transmit SL CG configurations and/or parameters for one or multiple receive SL CG configurations. Parameters for each transmit SL CG configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally Destination ID or destination group ID Parameters for each receive SL CG configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally source ID or source group ID The time domain resource configuration may include optionally a periodicity, optionally an offset (also referred to as starting slot), transmission pattern, repetition number (K), RV sequence for repetition, and optionally length of the transmission pattern etc. . . . . . Transmission pattern in the time domain may be indicated using a bitmap indicating which time slot can be used for the UE to transmit SL data.

The frequency domain resource configuration may include, for example, the active Bandwidth part (BWP) used for SL transmission and subchannels/Resource block group (RBG) of the BWP. In some embodiments, the frequency domain configuration may first indicate the starting RB of the first frequency sub-channel (RB_{start}), number of RBs per frequency subchannel (N_{RB_in_subchannel}), and the total number of frequency sub-channels (n_{subchannel}) available for the SL transmission. The above parameters can be used to determine the range and partition of frequency subchannels. For example, in a resource grid as shown in in FIG. 1A described in detail below, the above parameters (starting RB of F0, number of frequency sub-channels is 4 and the number of RBs per sub-channel is the number of RBs in F0) can define the frequency location and size for F0 to F4. The above parameters can be UE specifically indicated (e.g. in RRC) or can be broadcast in system information for multiple UEs. The frequency domain configuration may then indicate the index of the frequency subchannel m to be used for the transmission. UE may then determine its frequency allocation corresponds to the RB that starts at RB index RB_{start}+ m*N_{RB_in_subchannel} and with n_{subchannel} number of continuous RBs to be use. In the case, a transmission pattern bitmap is determined in time domain and different subchannels may be used in frequency domain for different repetitions of the TB, the frequency domain configuration may further indicate the frequency index for each transmission/repetition of the TB. For example, in case of the example shown in FIG. 1A, F0 to F4 may corresponds index m as 0, 1, 2, 3, respectively, and the frequency domain resource configuration may indicate a frequency channel index sequence corresponding to each transmission of the TB, which is {0, 2}, corresponding to F0 and F2 for first and second transmission of the TB. In some embodiment, the resource assigned to each PSSCH transmission may include more than 1 subchannel in the frequency domain. In this scenario, in addition to indicating the above definition of subchannel, the resource configuration may further include the starting subchannel index and the number of subchannels used for each PSSCH transmission. The starting subchannel index and the number of subchannels used can be individually defined for each repetition. Alternatively, the number of subchannels used for each repetition may be the same and only the starting subchannel index need to be signaled for each repetition. In another embodiment, the starting subchannel index may be defined for just the initial transmission, the starting subchannel index for the rest of the repetition can be the same as the initial transmission or determined by the starting subchannel index along with frequency hopping parameters or through frequency domain pattern indication.

If a SL control channel is defined, the time and frequency domain resource configuration for the SL control channel PSCCH (or scheduling assignment (SA)) may share the same above configuration for SL data channel or have their own separate configuration.

Time frequency resources may include the number of sub-channels used for each SL data or physical sidelink shared channel (PSSCH) transmission (which may be referred to as a PSSCH partition). Note that the definition of subchannels may have been defined in resource pool configuration and then if the SL CG configuration is defined within the resource pool, the definition of subchannel does not need to be redefined within the SL CG configuration. The definition of sub-channel may include size of subchannel (e.g. in resource blocks), and/or number of subchannels in frequency domain. The location of sidelink control channel (SCI) can be signaled in different methods. In some embodiment, the pool of all SCI location (also named PSCCH pool) may be defined first in the resource pool and then the exact location of SCI can be further defined in the SL CG configuration. In one example, if PSCCH is not transmitted in adjacent RBs with PSSCH, the PSCCH pool is a separate region in frequency domain next to the frequency subchannels used for data transmission. Each SCI corresponding to each data frequency channel is equal size. Therefore, once the PSCCH pool is defined, e.g. through signaling the starting RB of PSCCH pool and the number of RBs used for SCI in frequency domain, UE can derive the location of SCI. In some embodiment, the number of RBs used in SCI is predetermined without signaling. In another scenario, SCI is always at fixed location with respect to the PSSCH transmission (e.g. 2 RBs for each slot transmission next to the PSSCH transmission). In both cases, a UE will be able to know where to detect SCI, either based on some default rule, or through configuration. Periodicity indicates the time duration between two neighboring GF resource or resource bundle that repeats over time. Here resource bundle refers to multiple PSSCH resources defined in a pattern. In some embodiments, the pattern is used for multiple repetitions of a TB. In some embodiments may allow the use of the resource pattern for transmission of different TBs. The pattern window length is the time domain length of which each transmission pattern is defined within.

Figure 3:
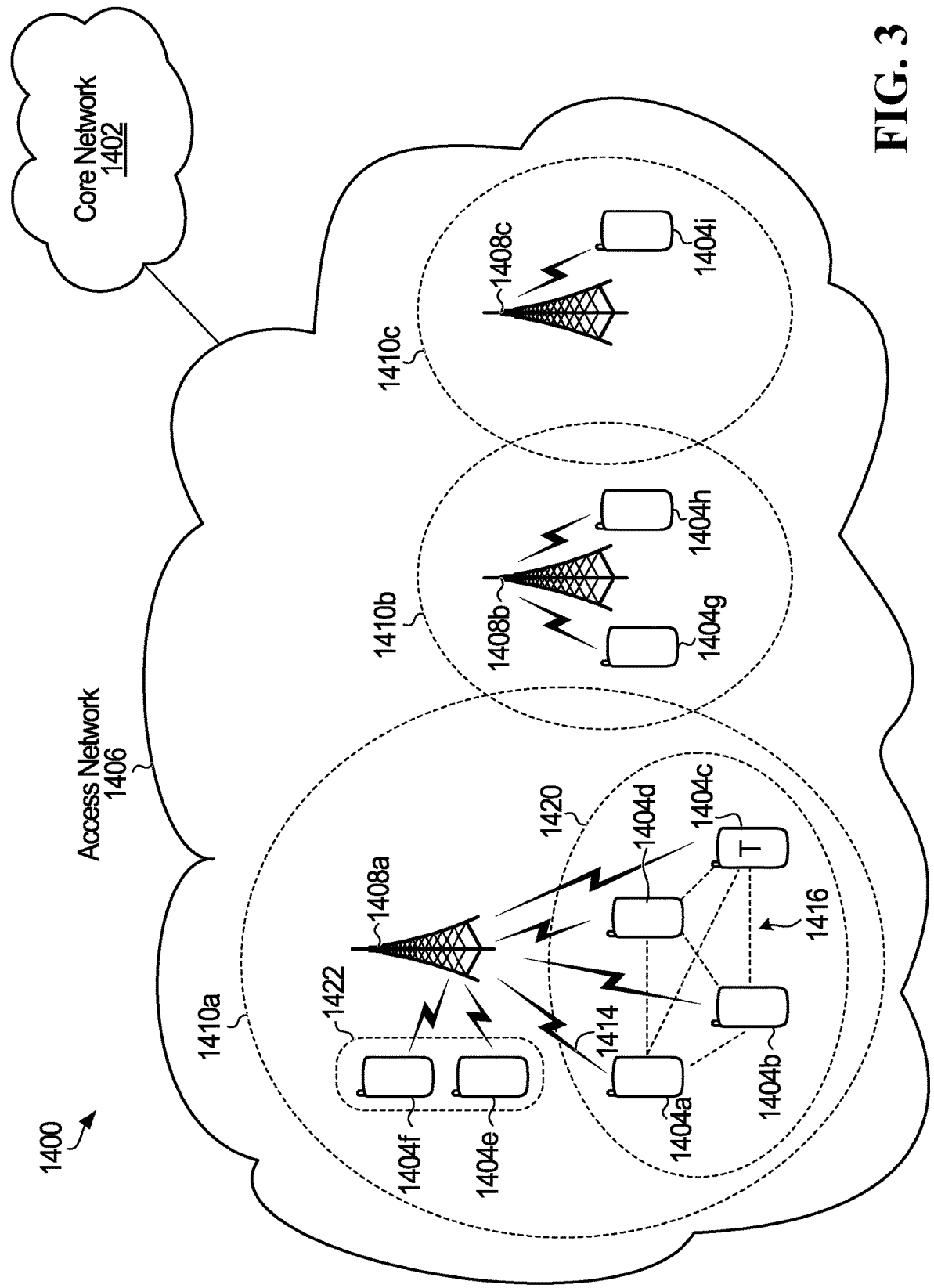
FIG. 3 is a block diagram illustrating an example of a telecommunications network according to one embodiment.

FIG. 3 shows a specific example of time frequency parameters, definition of subchannnels, transmit pattern etc. With this example, time is on the horizontal axis and frequency is on the vertical axis. Frequency is divided into four; each division is the frequency partition for one PSSCH transmission in frequency domain, which may be one or multiple resource blocks. Each frequency partition may be one subchannnel or multiple subchannels. The number of RBs and starting RBs for each frequency subchannel may be determined from the resource configuration or definition of resource pool or pattern pool. The number of subchannels used for each PSSCH transmission in the frequency domain in the case when multiple subchannels can be used may also be signaled in the resource configuration. Time is shown divided into ten time units; each division is the size of PSSCH transmission in the time domain, and may be one or multiple OFDM symbols. Each division can be a slot. A transmit pattern is made up of multiple blocks of time frequency resources. For example, the pattern labelled UE1 has a block in F0, T1, and another block in F2, T2. Shown are 19 patterns within the depicted resource. Note that in the pattern shown below, T0 to T4 shows a pattern window, within which the non-overlap pattern of VUE1 to VUE10 is defined. 10 new patterns for another different 10 UEs (VUE11-VUE20) are defined in T5-T9, which is a repetition of the 10 patterns defined in T0-T4. The 20 patterns defined within the pattern grid shown in the figure may be repeated over time for VUE1 to VUE 20, i.e., VUE1 to VUE20 may be configured a new pattern of two resources every 10 time units. Use 1 time unit (T0) equals 1 slot as an example, in the example pattern pool defined in the following figure, the pattern window length=5 slot and periodicity=10 slots.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern may represent transmissions of one transport block (TB), i.e., a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE may also listen to other UE's transmissions in the "off" slots defined by the transmission pattern or any slot that is not defined as an "on" slot in the transmission pattern.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half-duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature are also contemplated.

Transmission patterns may belong to a transmission pattern set or pool that is common to a group of UEs. RRC signaling may be used to configure the transmission pattern for a UE and/or a transmission pattern pool. Transmission pattern pool may also be signaled by broadcast signaling (e.g. in SIB).

FIG. 1A is a block diagram illustrating an example of a two-dimensional resource configuration for grant-free SL transmission. This is an example of a transmission pattern. FIG. 1 illustrates a resource grid 300, which includes frequency-domain resources F0, F1, F2 and F3, and time-domain resources T0, T1, T2, T3 and T4. Each combination of frequency-domain resource and time-domain resource forms a communication resource for SL transmission. FIG. 1A also illustrates a transmission pattern for a UE1. Resource grid 300 indicates a time-frequency communication resource for two transmissions by UE1, as well as a redundancy version (RV) (RV0 or RV3) in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (e.g. configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 300 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access), space-domain resources, and/or different demodulation reference signals (DMRS). Moreover, the transmission patterns are not limited to two-dimensions, and therefore could include a number of dimensions greater or less than two.

In some embodiments, frequency-domain resources, pilots and layer index may be associated with time-domain signatures. For example, as an alternative to using a UE index, the resource grid 300 could indicate only the time-domain signature or time-domain transmission pattern, and other dimensions (e.g. the frequency-domain dimension) may be derived from it.

Figure 1B:
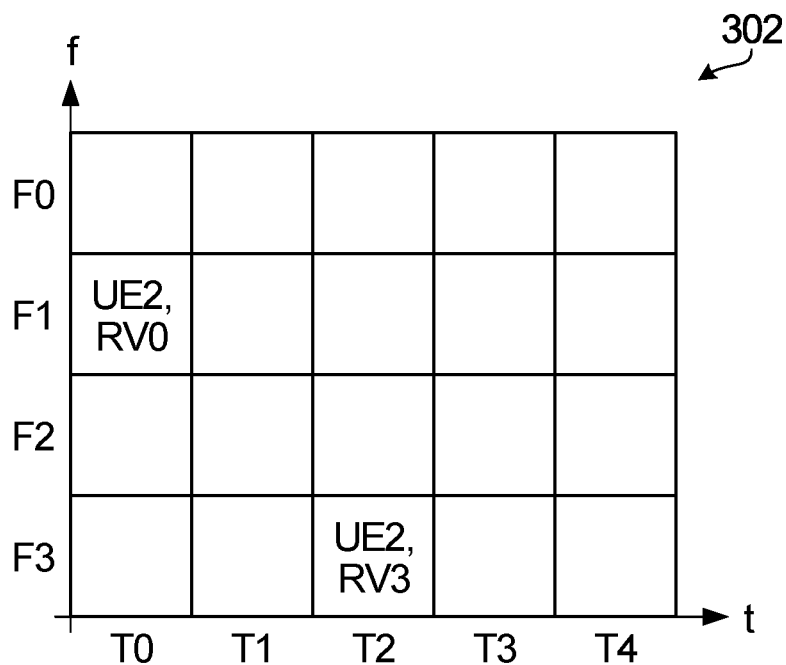
FIGS. 1B-1K are block diagrams illustrating other examples of two-dimensional resource configurations for grant-free SL transmission.
Figure 1C:
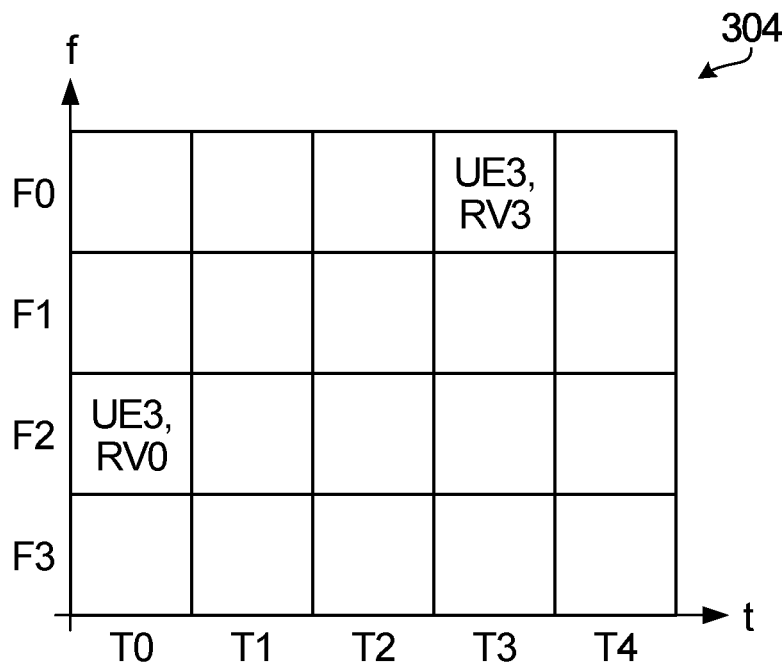
Figure 1D:
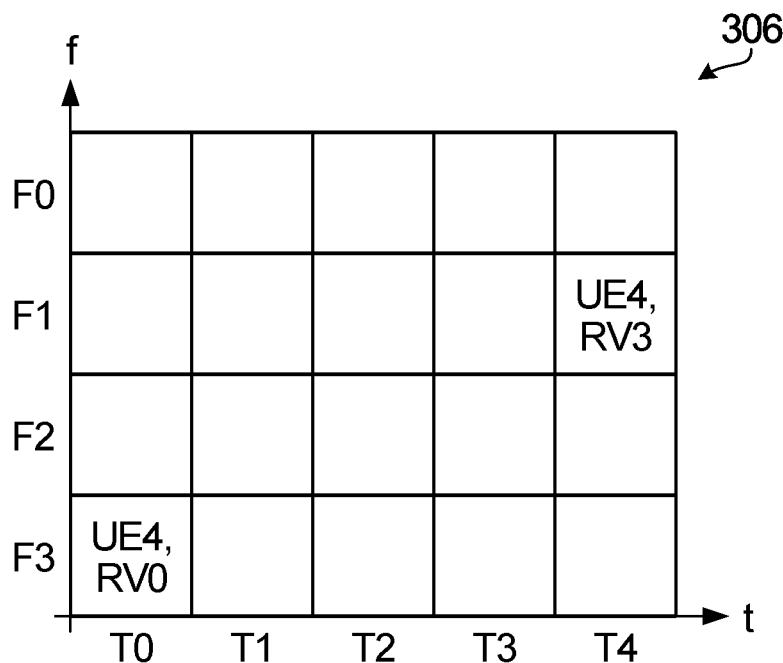
Figure 1E:
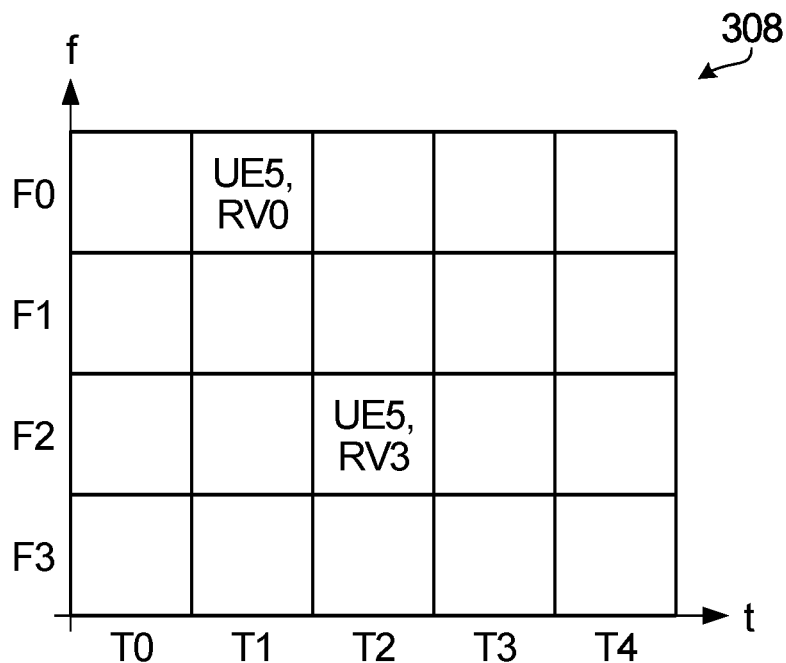
Figure 1F:
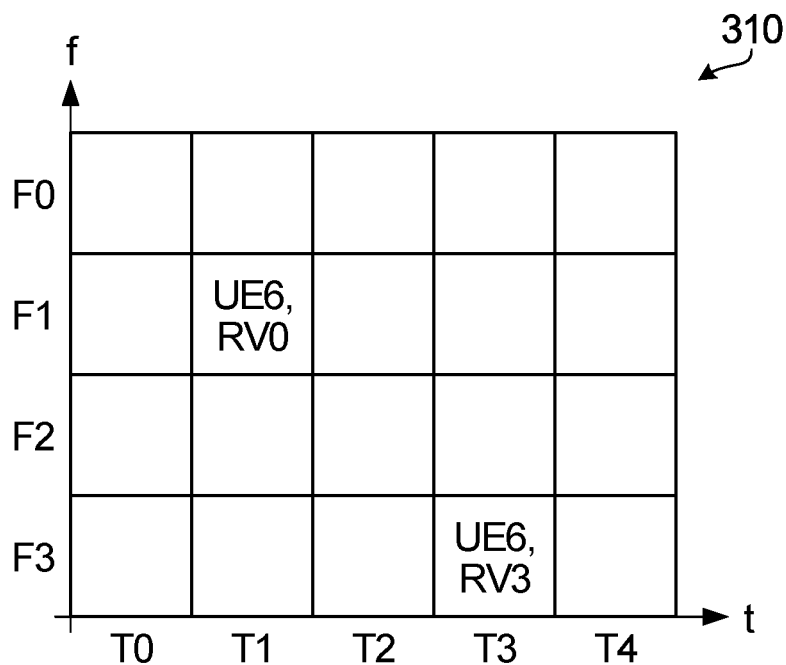
Figure 1G:
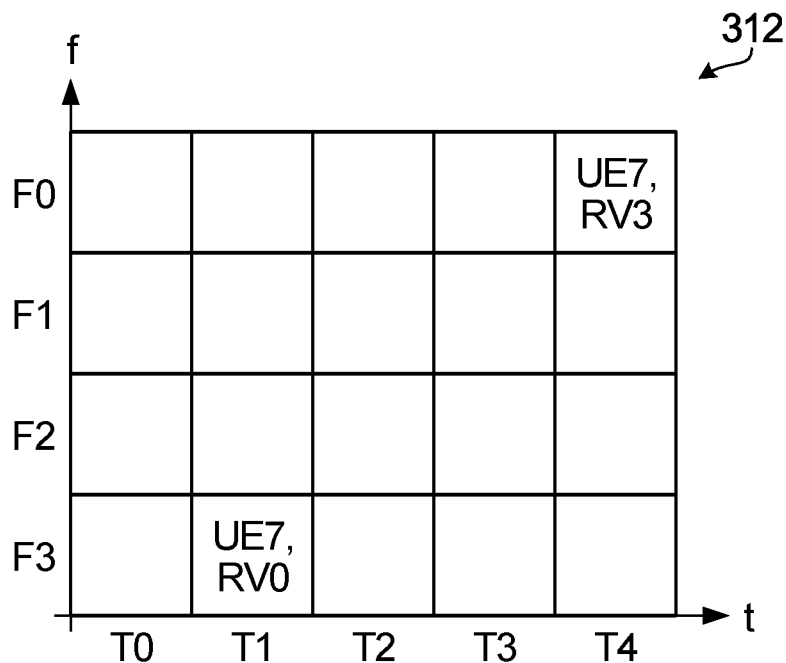
Figure 1H:
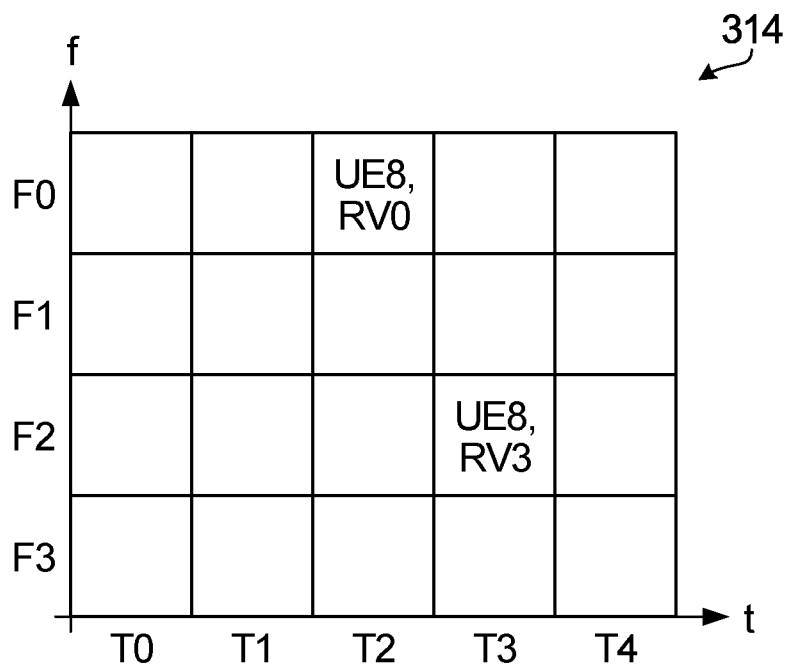
Figure 1I:
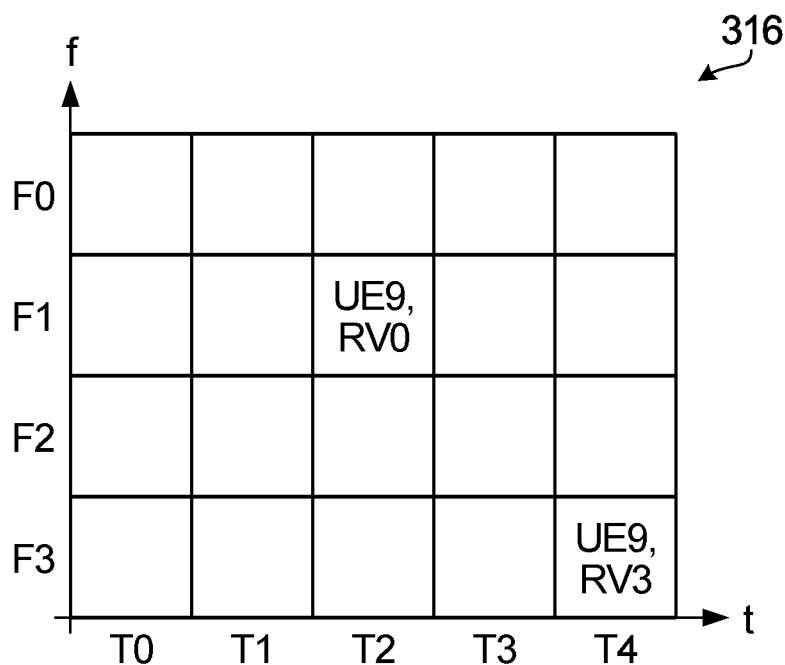
Figure 1J:
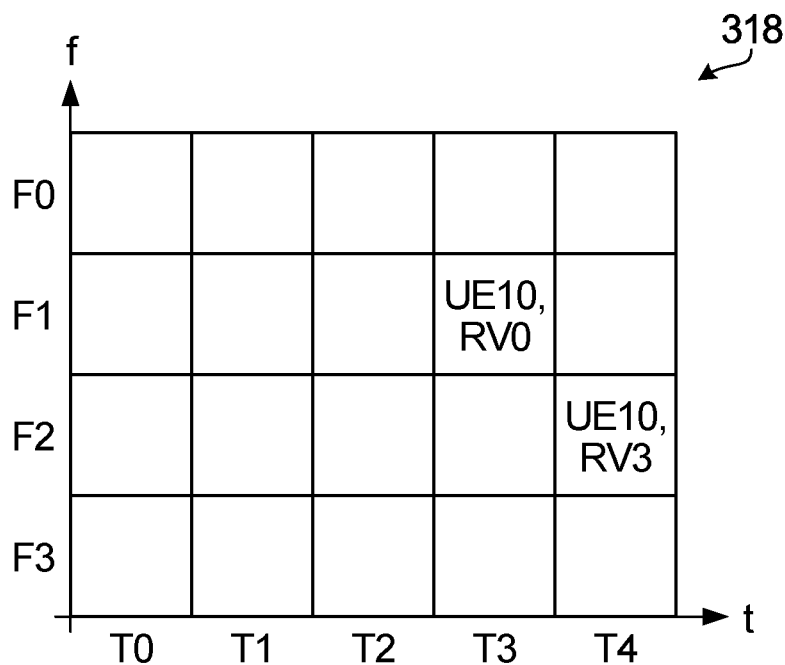

FIG. 1B is another block diagram illustrating an example of a two-dimensional resource configuration for grant-free SL transmission. FIG. 1B illustrates a resource grid 302. Resource grid 302 includes the same frequency-domain resources F0, F1, F2 and F3, and time-domain resources T0, T1, T2, T3 and T4 as resource grid 300 in FIG. 1A. FIG. 1B also illustrates a transmission pattern for UE2.

Resource grid 302 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 302 for UE2 are different from the time-frequency communication resources indicated in resource grid 300 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 304, 306, 308, 310, 312, 314, 316 and 318, respectively, each resource grid including the same frequency-domain resources F0, F1, F2 and F3, and time-domain resources T0, T1, T2, T3 and T4 as resource grid 300 in FIG. 1A. Resource grids 304, 306, 308, 310, 312, 314, 316 and 318 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource indicated by resource grids 300, 302, 304, 306, 308, 310, 312, 314, 316 and 318 are unique.

Figure 1K:
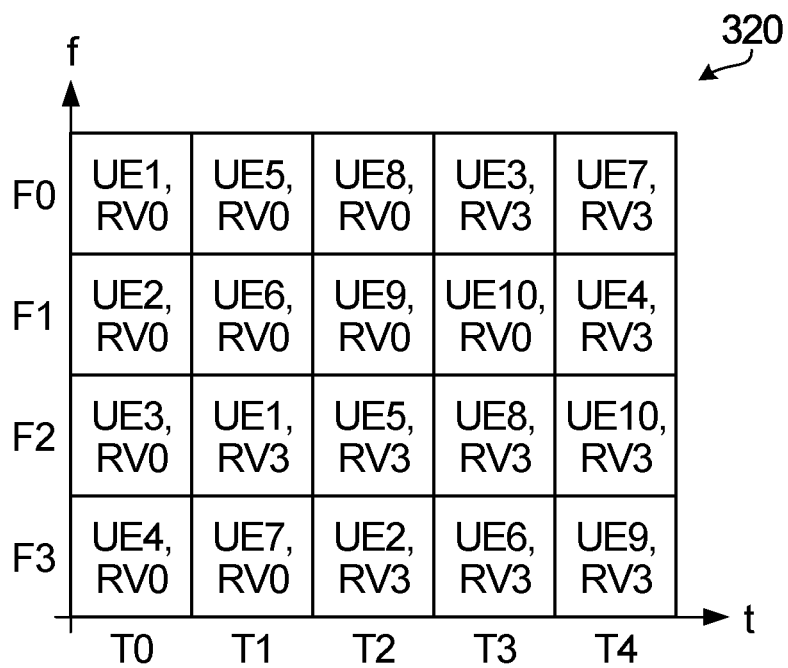
Figure 2:
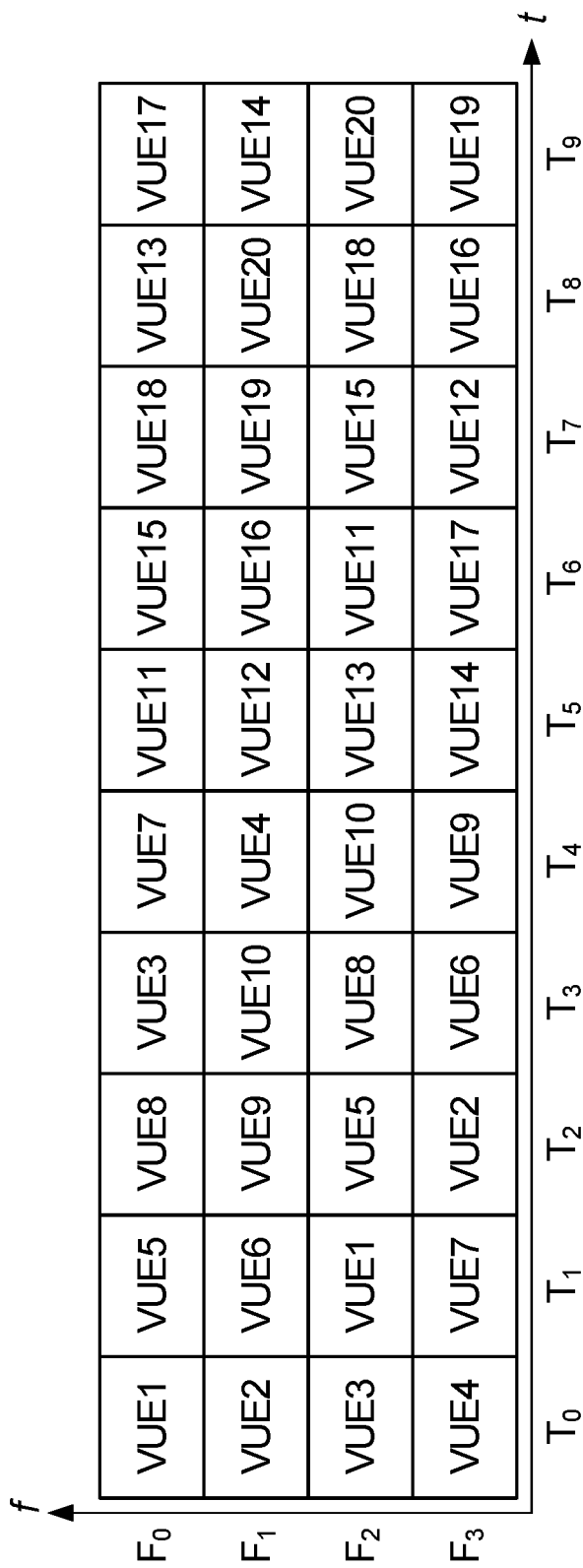
FIG. 2 is a specific example of time frequency parameters, definition of subchannnels, transmit pattern etc.

FIG. 1K is yet another block diagram illustrating a two-dimensional resource configuration for grant-free SL transmission. FIG. 1K illustrates resource grid 320, which also includes the same frequency-domain resources F0, F1, F2 and F3, and time-domain resources T0, T1, T2, T3 and T4 as resource grid 300 in FIG. 1A. Resource grid 120 is a superposition of resource grids 300, 302, 304, 306, 308, 310, 312, 314, 316 and 318. Therefore, resource grid 320 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. In FIG. 1K, according to their respective transmission patterns, each UE transmits a TB twice over the length of the configured transmission pattern, therefore the repetition number of each transmission pattern is 2. As explained below, this allows each UE receive at least one transmission of the TB by the other UEs.

For transmission, each UE may be configured one or multiple sets of transmit parameters. Each set of transmit parameters may include time/frequency location, periodicity, frequency sub-channel definition, DMRS/preamble, transmission pattern, SCI location, MCS, repetition K, HARQ process related parameters, feedback channel, and in some embodiments destination ID. If the set of parameters includes the destination ID, the UE may use the set of parameters for transmission to the specific UE or UE group defined by the destination ID. If a UE is configured with set of parameters without the destination ID, the UE may use the set of parameters for transmission to any UE or UE group.

Sensing for SL Transmission

In some of the embodiments described herein, for the purpose of a UE to UE sidelink transmission, the transmitting UE selects a transmission pattern to use for the transmission.

The transmitting UE1 is aware, via higher layer SL CG configuration achieved using one of the various methods described below, of the pool of possible patterns before making the selection. The pool of transmission patterns is one specific example of SL transmission resources.

In some embodiments, the resources that the UE can select between are configured based on a SL communication resource configuration. The SL communication resource configuration can be a pattern (one-dimensional, two-dimensional, etc.), also known as time-frequency repetition pattern, etc.), a pool of patterns, and a repetition number. For example, the SL communication resource configuration could be pre-configured. The configured/pre-configured SL communication resource configuration may be provided by a device manufacturer or a network operator (e.g., via a subscriber identity module). The SL communication resource configuration may be also provided by the network operator when a UE is in coverage of a base station so that the SL communication resource configuration is available wherever the UE may be, such as when the UE moves out of the network coverage.

In some embodiments, selection of transmission resources from a pool is based on long-term sidelink measurement. In some embodiments, this approach is performed only when the UE is out of network coverage. Alternatively, the approach can be employed at any time irrespective of whether the UE is in or out of network coverage.

More specifically, a transmitting UE will monitor sidelink transmission resources on an ongoing basis. This can involve monitoring a pool of possible transmission resources or a pool of transmission patterns, for example. For example, the UE may measure reference signal receive power (RSRP) or reference signal receive quality (RSRQ) or some other characteristic of signals that might be present on the resources. The measurements may be averaged over a defined period of time to generate a metric for each transmission resource. A higher metric for a given resource is an indication that the given resource is more heavily loaded on average. Then, the UE takes this information into account in making a selection for transmission.

In a specific example, the UE ranks the possible resources according to the calculated metric, and selects the resource with the most favourable metric (which can be the lowest or the highest depending on the nature of the metric). If the metric reflects some measure of average power, the UE would select the lowest metric, as this would reflect the least loaded resource. In another embodiment, the UE can select, for example randomly, from any resource that has a metric below/above a predefined threshold. In another embodiment, the UE can select, for example randomly, from the top X percent of resources that has a metric below/above a predefined threshold where X can be a number less than 100, typically 10 or 20.

A specific example will be described with reference to FIG. 1K. Here, on an ongoing basis, the UE monitors each of the four frequencies F1, F2, F3 and F4, over the five time periods (which are assumed to repeat cyclically in this example). A metric for each pattern is determined based on this monitoring. For example, for the UE1 pattern, the transmitting UE measures on F1 during T0, and F3 during T1, and produces a metric for the UE1 pattern by combining these measurements. Such measurements are done for each of the patterns. The patterns are then ordered by metric and a pattern is selected based on the ordering. The decision may be based on the metric determined for measurements over a specified window of time, for example over a configured number of time slots, or more generally a configured period of time (which can be configured in terms of a number of time slots or some other basis).

Optionally, the UE may also perform this long-term sensing procedure in order to independently and dynamically select between different grant-free SL configurations.

In some embodiments of the invention, a transmitting UE makes a selection of a transmission resource, for the purpose of a sidelink transmission, based on additional information obtained from short-term sidelink measurement. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will monitor SL transmission resources on a short-term basis, just before making a selection of a resource for a sidelink transmission. This can involve making a short-term measurement of a pool of possible transmission resources or pool of transmission patterns, for example. For example, the UE may measure energy levels across a specified frequency band(s). The UE may then perform a clear channel assessment (CCA) by comparing the measured energy levels to a specified threshold. The short term measurement allows the UE to assess whether a given resource is being used during a current transmission period. Then, the UE takes this information into account in making a selection for a current transmission.

The measurements can, for example, be similar to those taken with listen before talk (LBT) protocols, which typically include a CCA procedure. In some embodiments, the UE makes the short-term measurements for multiple resources, possibly all, and makes a selection based on the measurements. This can involve determining which of the resources are not being used for a current transmission period, and selecting between those resources. In another embodiment, the UE makes an initial selection of a resource for transmission (possibly based on sidelink control information and/or long-term sidelink measurements) and then makes the short term measurement for the selected resource. If the resource is occupied as indicated by the short-term measurement, the UE makes another selection, or waits a backoff time, for example a random backoff time, before measuring the same resource again. Once the UE identifies a resource not being used, the UE goes ahead with the transmission using that resource.

A specific example will be described with reference to FIG. 1K. Assume the UE has made an initial selection of pattern UE1. The UE makes a short term measurement of the resources for UE1. If such measurement indicates the pattern is not being used, the UE can go ahead with the sidelink transmission using that pattern. If the short term measurement indicates that pattern is being used, the UE selects a different pattern or waits a random backoff time before performing another short term measurement of the resources for UE1.

In some embodiments, the selection of a transmission resource for sidelink transmission is based on a combination of sidelink control information and long-term sidelink measurement.

In some embodiments, the selection of a transmission resource for sidelink transmission is based on a combination of sidelink control information and short-term sidelink measurement.

In some embodiments, the selection of a transmission resource for sidelink transmission is based on a combination of short-term sidelink measurement and long-term sidelink measurement.

In some embodiments, the selection of a transmission resource for sidelink transmission is based on a combination of sidelink control information, long-term sidelink measurement, and short-term sidelink measurement.

Monitoring of transmission resources as described above can also be referred to as sensing, and this can include short-term measurements and/or long-term measurements.

Optionally, the UE may also perform this short-term sensing procedure in order to independently and dynamically select between different grant-free SL configurations.

Figure 4:
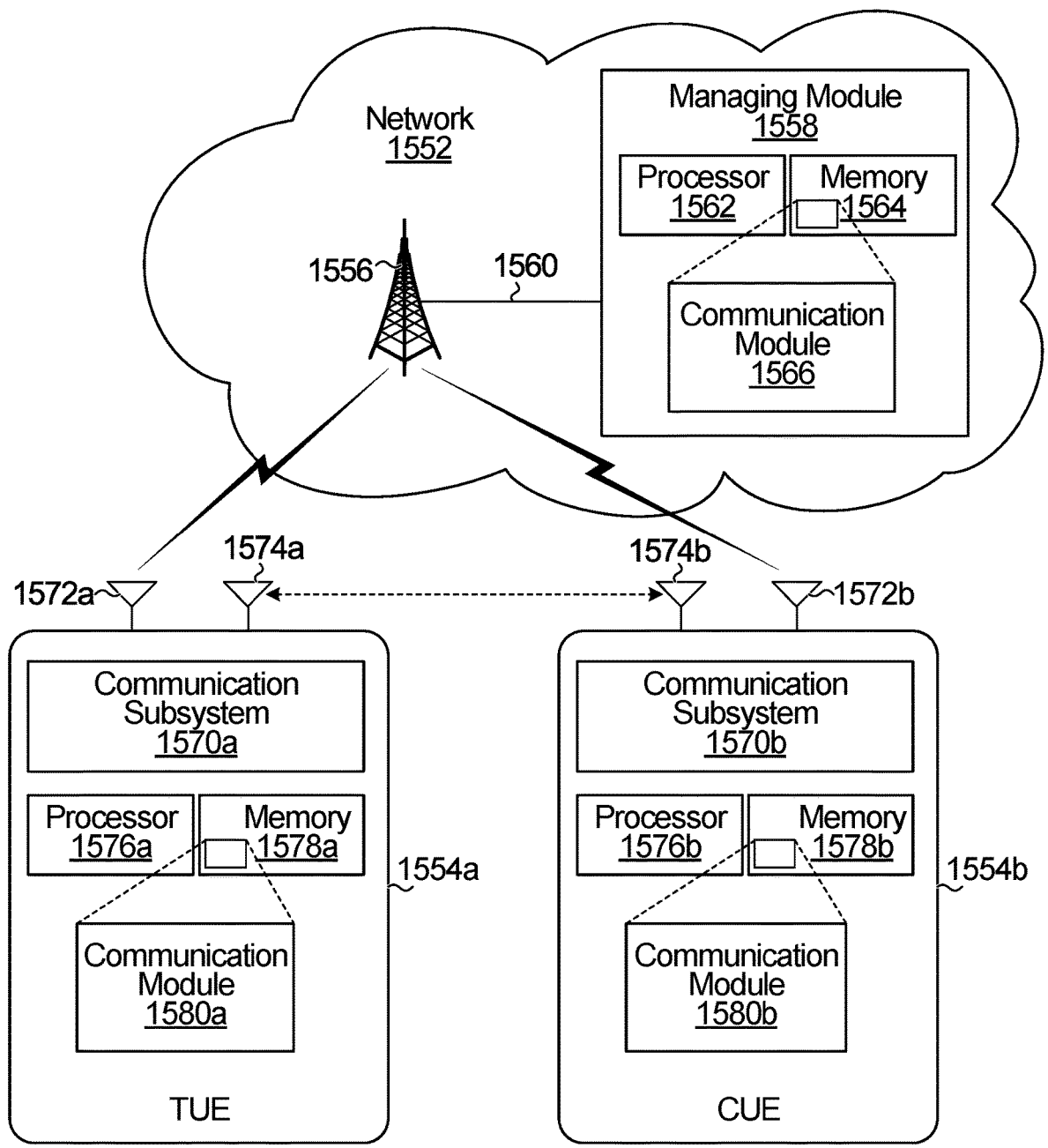
FIG. 4 is a block diagram illustrating an example of a network serving two UEs.

FIG. 4 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provides a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 4, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and Wi-Fi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and so is the TUE 1404c. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 4 form another UE group 1422.

Figure 5:
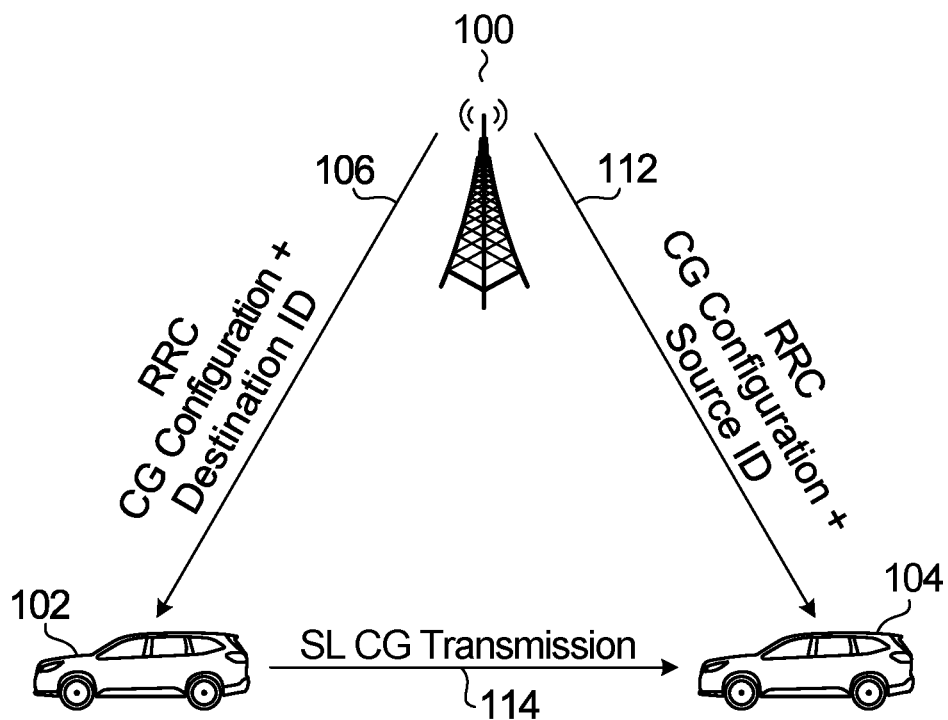
FIG. 5 is a diagram of SL CG configuration in which the network transmits SL CG to both transmit UE and receive UE.

FIG. 5 is a block diagram illustrating an example of a network 1552 serving two UEs 1554a and 1554b, according to one embodiment. The network 1552 may be the access network 1406 from FIG. 4, and the two UEs 1554a and 1554b may be two of the four UEs 1404a-d in FIG. 7, or the UEs 1554a and 1554b may be UEs 1404e and 1404f in FIG. 4. However, more generally this need not be the case, which is why different reference numerals are used in FIG. 5.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 254b. The CUE 1554b may be able to assist with wireless communications between the BS 1556 and TUE 1554a if a UE group were to be established that included TUE 1554a and CUE 1554b. Other communication scenarios are also contemplated, in a V2X application, for example.

UE 1554a may be specifically chosen as the target UE by the network 1552. Alternatively, the UE 1554a may itself determine that it wants to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554a acts only as a target UE, i.e., TUE 1554a, and the UE 1554b is a cooperating UE to the TUE 1554a, i.e., CUE 1554b.

FIGS. 4 and 5 illustrate systems in which embodiments could be implemented. In some embodiments, a UE includes a processor, such as 1576a, 1576b in FIG. 5, and a non-transitory computer readable storage medium, such as 1578a, 1578b in FIG. 5, storing programming for execution by the processor. A non-transitory computer readable storage medium could also or instead be provided separately, as a computer program product.

Further details of other options are described in Applicant's Application No. 62/791,722 filed Jan. 11, 2019 and 62/755,392 filed Nov. 2, 2018, both of which is hereby incorporated by reference in its entirety.

In general, the resource configuration or configured grant is configured at least to the transmit UE. The transmit UE then can send the SL data transmission on PSSCH following the resource and parameters that are configured in the SL CG configuration.

If there is a SCI or PSCCH associated with PSSCH or SL data transmission, the receive UE may be able to identify the transmission resource and/or parameters by decoding the SCI. If there is no SCI or PSCCH transmission associated with PSSCH or SL data transmission, the receive UE may need to rely on another method to identify the SL transmission parameters. In another scenario, SCI may not be able to include all the parameters that the receiver needs to know to decode the PSSCH transmission due to limited resources of the SCI, which needs to be sent for every PSSCH transmission. In this case the receive UE may need to rely on another method to obtain these parameters.

Various embodiments provides various solutions to the above problem. Embodiments of the disclosure provide solutions this above problem through the use of higher layer SL signaling, for example a PC5 RRC signaling or SL RRC signaling, to send part or all of a SL CG configuration to the receiving UE via PC5 RRC signaling is a radio resource control (RRC) signaling sent by a UE in SL channel. Note that some times the RRC signaling send by the UE via SL is called PC5 RRC signaling. PC5 RRC is a RRC signaling that serve a similar function to the RRC signaling in LTE/NR except it is sent by a UE instead of a BS and it is through a PC5 link or SL transmission. By sending at least part or all the SL CG configuration to the receiving UE, the receiving UE is able to identify the time frequency resource and other transmission parameters based on the SL CG configuration sent by the transmitting UE via SL or PC5 RRC or other higher layer SL signaling. This is especially useful for unicast and groupcast where the receive UEs can be known in advance.

For the purpose of this description, higher layer signaling is any signaling in a layer above layer 1. Examples of higher layer signaling include RRC signaling and system information blocks (SIB). Examples of layer 1 signaling include downlink control information (DCI), uplink control information (UCI), and sidelink control information (SCI).

In some embodiments, using PC5 RRC or other higher layer signaling, a UE relays all or part of SL CG configuration that is configured for another UE by a gNB to the other UE.

In some embodiments, a SL CG configuration may include at least a resource pool configuration. In some other embodiments, a SL CG configuration may be defined within a resource pool. The resource pool may be used to define the resources that can be selected by UE or scheduled by gNB for SL transmissions. In some embodiments, there is a separate transmit resource pool and receive resource pool configuration. The transmit RP may be used by the UE as a potential pool of resource for SL transmission. The receive RP may be used to define the resources that the UE needs to monitor or listen for reception. In some embodiments, one resource pool maybe defined for the UE for both transmission and reception of SL transmissions. The resource pool may also define the division of frequency sub-channels as well as potential locations of SCI or PSCCH if SCI associated with SL data is also transmitted.

Embodiment: CG Type 1 and Type 2 Configuration

The description concerns embodiments on SL CG Type 1 and Type 2 configuration without transmitter delivery of SL CG configuration to the receive UE.

In CG Type 1—also known as grant-free transmission: the configured grant resource is semi-statically configured by RRC signaling (which may include a RRC configured grant). The transmit UE uses the configured resource without dynamic signaling (e.g. DCI) to perform SL transmissions. After the transmit UE obtains the RRC signaling from BS, the transmit UE has obtained all the configuration needed for SL CG transmission. When data packet arrives, the transmit UE can perform SL data transmissions according to the SL CG configuration. The configuration may include, e.g., periodic resources. Note that the SL CG configuration is semi-statically configured and transmit UE can use the same SL CG configuration for multiple TBs of SL transmissions until the configuration is deactivated. The transmit UE may further receive RRC signal to update the configuration. The transmit UE may also receive RRC signal from BS to deactivate the configuration, after receiving the deactivation signal, the transmit UE cannot further perform SL CG transmission until the SL CG configuration is reactivated.

Mode 1—CG Type 2: The configured grant resource is configured by RRC signaling and DCI signaling. In type 2 CG, the transmit UE may receive some CG configuration in RRC signaling and then the transmit UE may further receive a DCI signal for configuration. The DCI may also be used for activation of SL CG configuration, which is named activation DCI. The transmit UE cannot perform SL CG transmission before the activation DCI is received. The DCI activation signal may also further includes the resource configuration of CG transmission. Once the transmit UE receives the DCI activation signal, the transmit UE has all the configuration information for SL CG transmissions. The transmit UE can then perform SL transmission according to the SL CG configurations from both RRC signaling and DCI signaling. The configuration may include, e.g., periodic resources. The transmit UE can use the same SL CG configuration for multiple TBs of SL transmissions until the configuration is deactivated. The transmit UE may further receive a DCI deactivation signal from BS, after receiving the deactivation signal, the transmit UE may deactivate the SL CG configuration and stop transmitting SL CG transmission before it is reactivated.

In Type 2 SL CG transmission, the resource is configured in a combination of higher layer signaling (e.g. RRC signaling) and layer 1 (L1) signaling (e.g. DCI signaling). The RRC signaling may include the parameter(s) that are not indicated in DCI, such as periodicity of resource. After the RRC configuration, the transmit UE may wait for a DCI activation signal from BS to activate the SL CG transmission. The DCI signal for activation may also include further information of configured grant configuration in addition to the information in RRC signaling, such as time and frequency resources, MCS etc. After receiving the activation signal, transmit UE will have obtained all the information for SL CG configuration, and can perform SL transmissions according to the SL CG configuration. SL CG type 2 transmission may be called SL semi-persistent transmission. The transmit UE may further receive a deactivation DCI from the BS or more generally from the network, which is used to deactivate the SL CG configuration. After receiving a deactivation DCI, the transmit UE may deactivate the SL CG configuration and not transmit SL CG transmission according to the SL CG configuration before the SL CG configuration is re-activated.

Figure 10:
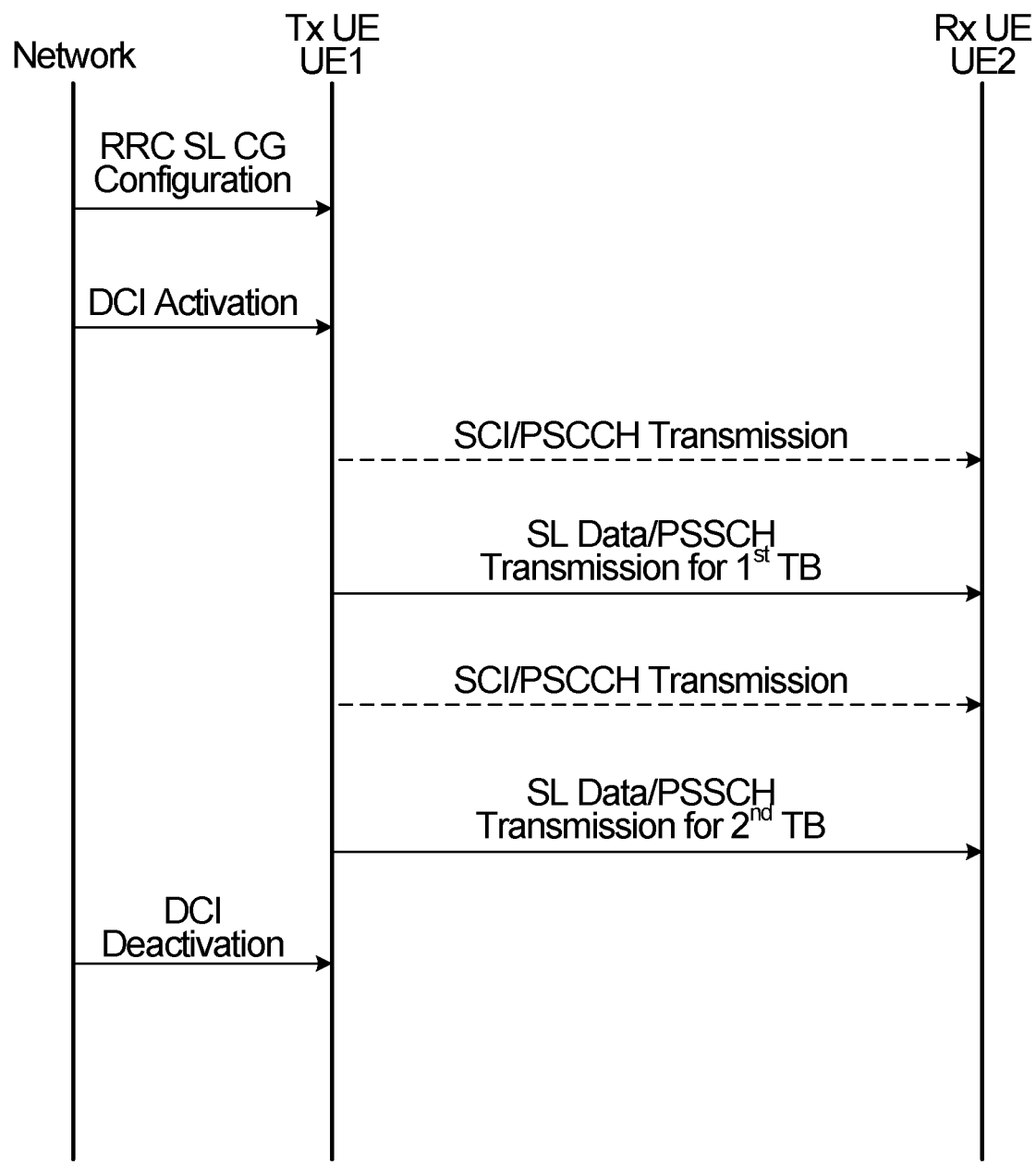
FIG. 10 is a signal flow diagram for an example of a Type 1 CG exchange.
Figure 11:
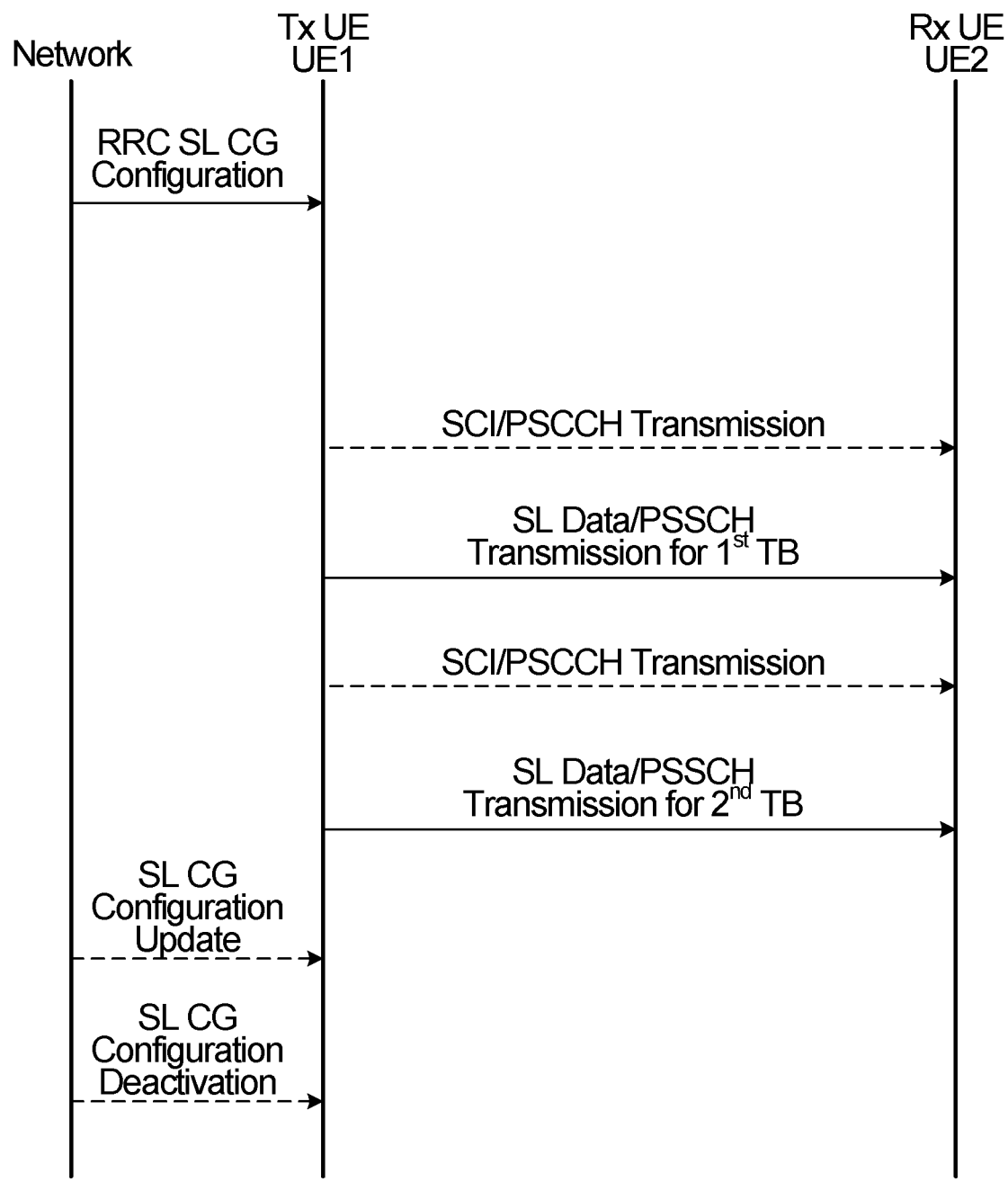
FIG. 11 is a signal flow diagram for an example a Type 2 CG exchange is shown in FIG. 11.

An example of a Type 1 CG exchange is shown in FIG. 10. An example of a Type 2 CG exchange is shown in FIG. 11.

Resource Configuration for SL CG Transmission

All of the embodiments described below involve the sending of a SL CG configuration to the UE for SL transmission or reception. The following describes a set of optional features of a SL CG configuration that can be used with any of the embodiments described herein. And all the configuration parameters may be part of the SL CG configuration that can be send to the receive UE (e.g. via RRC or SL RRC signaling) in the embodiments of the disclosure.

A SL CG configuration or SL CG configurations for a UE may include a configuration for SL CG transmission and a configuration for SL CG reception. A UE can have a transmit SL CG configuration and receive SL CG configuration simultaneously. In one embodiment, the SL CG configuration may be structured as: a field of SLConfiguredGrantConfig, which indicates SL CG configuration. In the SL CG configuration, there may be a field for SLTxConfiguredGrantConfig, which includes configured grant configuration for transmission and optionally a field for SLRxConfiguredGrantConfig, which includes configured grant configuration for reception. SLTxConfiguredGrantConfig may optionally include destination ID while SLRxConfiguredGrantConfig may optionally include source ID. In some embodiment, there are one or multiple configurations of SLTxConfiguredGrantConfig and SLRxConfiguredGrantConfig, but they don't have to be belong to the same SLConfiguredGrantConfig.

```
SLConfiguredGrantConfig
    {SLTxConfiguredGrantConfig
    SLRxConfiguredGrantConfig}
SLTxConfiguredGrantConfig
    {SL CG configuration parameters for transmissions(such as time
frequency resources, MCS, DMRS configuration etc.)
    Optionally Destination ID}
SLRxConfiguredGrantConfig
    {SL CG configuration parameters for receptions (such as time
frequency resources, MCS, DMRS configuration etc.)
    Optionally source ID}
```

Alternatively, the SLConfiguredGrantConfig may include all the configuration parameters and optionally includes an indication or flag to indicate whether the configuration is for transmission or reception. And there may be field to optionally include source ID and/or destination ID. In some embodiments, including a source ID implies the SL CG configuration is for reception and including a destination ID implies the SL CG configuration is for transmission. There may be other ways to identify whether SL CG configuration is for transmission or reception and therefore not need to be explicitly signaled inside the SL CG configuration. For example, a SL CG configuration from RRC signaling from BS maybe considered a CG configuration for transmission and a SL CG configuration from SL RRC signaling from a UE maybe considered a CG configuration for reception.

```
SLConfiguredGrantConfig
{
SL CG configuration parameters for transmission and/or reception
(such as time frequency resources, MCS, DMRS configuration etc.)
Source ID (optional)
Destination ID (optional)
TxRxIndication {0 for Tx, 1 for Rx}: Indicate whether CG used for
transmission or reception (optional)
}
```

The SL CG configuration for one or both transmit and receive configuration may include one of, or a combination of two or more of:
a) Time domain resource configuration—any configuration necessary to configure the resources in time domain. Examples include periodicity, a time domain offset, size of PSSCH time domain allocation, symbols used for PSSCH transmission, length of transmission pattern window and bitmap for time location of each repetition and other transmission pattern configuration etc. where:
Periodicity may indicate the periodicity of the CG resource or the time duration between two neighboring periodic resources;
Time domain offset may indicate the starting time location of CG PSSCH transmission resource in one period or the relative starting time location of the CG PSSCH resource within one period;
Size of PSSCH time domain allocation may indicate number of slots used for one PSSCH transmission. In some embodiment, it defaults at 1 slot and does not need to be indicated;
Symbols used for PSSCH may indicate the symbols among a slot (e.g. indicated by starting symbol and number of consecutive symbols used) that are used for PSSCH transmission;
length of transmission pattern window may indicates the time duration of the transmission pattern window (e.g. the number of slots) and Bitmap for time location of each repetition may indicate the relative time location of each repetition. They have been described in this disclosure for the transmission pattern configuration.
b) Frequency domain resource configuration—any configuration necessary to configure the resources in the frequency domain. Examples include:
Subchannel definition: for example starting, ending resource block (RB) and size of subchannel in terms of number of RBs;
Starting location and size of PSSCH transmission (in terms of RBs or subchannels)
Frequency hopping information or frequency subchannel index of each repetition. In case each PSSCH transmission includes multiple subchannels, the frequency subchannel index of each repetition may be indicated, e.g., as a size of the PSSCH transmission and a starting frequency subchannel index of each repetition.
Frequency hopping may include a field "IntroorInterFrequencyHopping" to specify whether it is 'intro-slot" frequency hopping or "inter-slot" frequency hopping. There may be another field for frequency hopping which indicates frequency hopping offset. The frequency hopping offset may indicate the frequency shift from the first hop to the second hop. In the case of inter-slot frequency hopping, the first hop may be an odd (even) slot and the second hop may be the next even (odd) slot. In the case of intra-slot frequency hopping, the frequency hopping offset may be from the first portion of the slot (which may contains a subset of symbols among all the symbols in the slot) to the second portion of the slots (which may contain another subset of symbols among all the symbols in the slots).
c) Resource pattern or TFRP
The details of resource pattern or TFRP has been described in more detail earlier in this disclosure.
d) Repetition number K
Indicate the number of repetitions or maximum number of repetitions for each TB.
e) Redundancy version (RV) sequence—
the RV sequence used for repetition. Each RV index of the sequence may corresponds to each repetition of a TB.
f) DMRS configuration
The DMRS may include configurations such as:
DMRS-Type: e.g. Type 1 or Type 2. Different DMRS Types may indicate a different density of DMRS within OFDM Resource elements and may corresponds different mapping of antenna ports to the DMRS time frequency pattern (density, TDM, FDM), different CDM group, different orthogonal cover codes etc.

maxLength

The maximum number of OFDM symbols for UL front loaded DMRS.

DMRS scramblingID or scramblingIDs

DMRS scrambling initialization for CP-OFDM, i.e., the scrambling ID or scrambling IDs used to initialize the DMRS sequence generation.

Antenna port

Antenna ports corresponding to the different antenna ports used for MIMO transmission. However, antenna port is also used to derive the DMRS. Antenna port along with other DMRS parameters maybe mapped to derive DMRS ports, DMRS patterns (e.g. different DMRS density, different time frequency location), different CDM group, different orthogonal cover codes used in time and/or frequency domain etc.

DMRS-SeqInitialization: DMRS sequence initialization

If there are multiple scrambling IDs configured, the field may indicate which DMRS scrambling ID is used.

g) MCS configuration

MCS configuration may include configuration of a MCS, which may indicate a modulation order, target code rate and TB size. The MCS may be an index from a MCS table. MCS table or tables can be predefined or signaled in SL CG configuration grant. It may also be multiple predefined or signaled MCS tables, where one of them is indicated in RRC signaling. For example, there may be a "mcs-Table" field which indicates one of multiple choices of MCS Table to be used for SL CG transmissions.

MCS configuration may include a MCS pool. MCS pool may signal or define or smaller number of choice among the MCS table used for general SL or UL/DL transmissions. The MCS pool may indicate the number of MCS choices that UE can use to transmit or receive for SL CG transmission.

h) HARQ related parameters

HARQ related parameters may include numofHARQ-Process, which may indicate maximum number of HARQ processes that can be used for SL CG transmissions.

i) Power control parameters

Power control parameters may include:

PathlossReferenceIndex: which indicates which reference signal is used to calculate or derive the path loss for power control.

P0-PSSCH-Alpha:

Which may indicate the target receive power P0 that is used for power control and indicate the path loss compensation factor Alpha used for power control.

j) PrecodingAndNumberOfLayers:

It may indicate the precoder and number of layers used for MIMO transmission k) Destination ID or destination IDs (optional)

Destination ID or IDs are the ID or IDs of the destination UE or UEs for the SL CG transmission. It may be optionally included in the CG configuration if it is known in advance.

l) Source ID or IDs

Source ID or IDs are the ID or IDs of the source or transmit UE/UEs for the SL CG transmission. It may be optionally included in the CG configuration.

For Type 2 SL CG configuration, some of the above parameters may be configured in RRC signaling. For example, periodicity (of the CG resources) should be included RRC signaling. Some of the above parameters, such as most parameters that are typically conveyed in a DCI scheduling grant, e.g. frequency resource, DMRS, MCS configuration may be included in a DCI. Some other parameters, such as the time domain offset, may be derived from the timing of receiving DCI activation signal.

An example of the division of different parameters that are conveyed in RRC and DCI for Type 2 configured grant are as follows:

RRC configured parameters:
Periodicity;
IntroorInterFrequencyHopping; DMRS-Type, MaxLength and DMRS scramblingIDs for DMRS configuration;
Mcs-table;
Resource allocation Type;
P0-PSSCH-Alpha in power control parameters;
Number of HARQ process,
Number of repetition K,
RV sequence;

PP DCI activation signal may include the following configurations:
Time Domain resource Allocation;
Frequency Domain resource Allocation;
Antenna port,
PrecodingAndNumberOfLayers:
DMRS-SeqInitialization
Frequency hopping offset
Resource pattern or TFRP;
UE specific MCS;
PathlossReferenceIndex
Etc.

Embodiment: Network Sends CG SL Configuration to Both Transmit and Receive UEs

In this embodiment, the network, for example a gNB or BS, semi-statically configures configured grant transmission parameters by transmitting a SL CG configuration to a transmit UE for transmission, and also transmits all or part of the SL CG configuration to the receive UE or multiple receive UEs for reception. The transmit UE then follows the SL CG configuration to send the SL transmission.

In some embodiments, the SL CG configuration is sent using separate UE-specific RRC signaling where the SL CG configuration for transmission is send to the transmit UE and part or all of the same SL CG configuration for reception is sent to the receive UE.

In some embodiments, this approach is used for SL Type 1 CG transmission.

In some embodiments, this approach can be used for SL Type 2 CG transmission. In the case of SL Type 2 CG transmission, there may be optionally information from SL CG configuration that is sent to the receiver via RRC signaling. In addition, DCI signaling containing SL CG configuration may be also signaled to the transmit and receive UEs.

The SL CG configuration sent to the transmit UE may further include a destination ID for the SL transmission. In the case of unicast, the destination ID may be the UE ID for reception. In the case of groupcast, the destination ID may be the ID of the target receive UE group. For broadcast, the destination ID may be for all potential receive UEs. The signal sent to the receive UE may further include a source ID, which indicates the ID of the transmit UE that is associated to the SL CG configuration.

In another embodiment, the SL CG configuration is sent to both the transmit UE and the receive UE via a single broadcast or multicast RRC signaling, such as group common RRC. For example, a group common RRC signaling may be transmitted for Type 1 CG. The configured grant configuration SL CG configuration may optionally include a destination ID and source ID or be associated with a destination ID and source ID that is broadcast or multicast in the same signaling.

The SL CG configuration sent to the transmit and receive UE may include the same transmission parameters but they are serving a different purpose for the transmit UE and the receive UE. Alternatively, only part of the parameters in the SL CG configuration of the transmit UE is sent to the receive UE. The SL CG configuration for transmission may be called a transmit SL CG configuration while the SL CG configuration for reception may be called a receive SL CG configuration. If a UE is configured both for SL CG transmission and reception, the UE may be configured with both a transmit SL CG configuration and a receive SL CG configuration that are different.

RRC signaling may be sent to transmitter to configure, update or deactivate the SL CG configuration. Note that as in Type 1 SL configured grant, if RRC signaling already include all the configuration information for SL CG transmission, the SL CG configuration may be considered already been activated after the RRC signaling or being indicated in the RRC signaling as activated. When UE receive an update of SL CG configuration, UE transmit SL CG transmission according to the updated SL CG configuration. When UE receive a deactivation signal, UE deactivate the SL CG configuration and stop performing SL CG transmission before the SL CG configuration is reactivated. In order for the receiver to also obtain the information regarding the configuration, update or deactivation of SL CG configuration, RRC signaling may also be sent the receiver UE or UEs to configure, update or deactivate the SL CG configuration for reception. This can be at least used for Type 1 configured grant transmission. In some embodiment, separate RRC signaling may be sent to transmitter and receiver to configured, update or deactivate the SL CG configuration. In some embodiment, group common RRC signaling may be sent or broadcast to both transmitter UE and receiver UE/UEs in the same signaling to configured, update or deactivate the SL CG configuration.

Similarly, DCI signal may be sent to the transmitter UE to further configure, update, activate or deactivate the SL CG configuration. Note that for the SL Type 2 configured grant transmission, the activation and configuration information may be sent in the same DCI. There may be also DCI signal sent to the receiver UE/UEs to configure, update, activate or deactivate the SL CG configuration. In some embodiment, separate UE specific DCI signaling may be sent to transmitter UE and receiver UEs to configure, update, activate or deactivate the SL CG configuration. This is typically used for Type 2 CG configuration. Referring to FIG. 5, shown is a system block diagram illustrating the above-described embodiment. Shown is a BS 100, a first UE 102 which will be the transmit UE for a SL transmission, and a second UE 104 which will be the receive UE for the SL transmission. The BS 100 transmits a SL CG configuration at 106 to the transmit UE 102 via RRC signaling, and optionally also sends a destination ID. The BS 100 also transmits a SL CG configuration at 112 to the receive UE 104 via RRC signaling, and optionally also sends a destination ID.

Embodiment: Network Sends CG to Transmit UE which Forwards to Receive UE

In this embodiment, the network sends a SL CG configuration to a transmit UE which includes transmission resource and parameter configuration. The SL CG configuration is sent semi-statically in higher layer signaling, such as RRC signaling, for performing SL CG transmission. The higher layer signaling may further optionally include the destination ID for the SL CG transmission. The destination ID can be part of the SL CG configuration or can be associated with the SL CG configuration. In the case of unicast, the destination ID may be the UE ID for reception. In the case of groupcast, the destination ID may be the ID of the target receive UEs or the receive UE group. For broadcast, the destination ID may be for all potential received UEs. The signal sent to the receive UE may further include a source ID, which indicates the ID of the transmit UE that is associated to the SL CG configuration. Following receipt of the SL CG configuration from the network, the transmit UE then sends the SL CG configuration, more generally at least part of the SL CG configuration, to the receive UE for reception via sidelink higher layer signaling, for example via a PC5 RRC. An example of the part of the SL CG configuration is for the transmit UE to send periodicity to the receive UE.

Besides the resource configuration and parameters in the SL CG configuration, the sidelink higher signaling may also optionally include source ID information to the receive UE. If the SL transmission is unicast, the SL CG maybe sent as a unicast SL transmission that targets one receive UE. If the SL transmission is to be groupcast transmission to a group of UEs, the SL CG configuration may be sent using group based signaling, for example using group based PC5 RRC signaling the UEs in the group originally targeted to receive the SL transmission. Similarly, if the SL transmission to be broadcast, then the higher layer signaling may be sent in a broadcast transmission, e.g. via PC5 based broadcast RRC signaling. More generally, wherever PC5 RRC signaling is referenced in this disclosure, alternatively some form of SL RRC signaling can be used, PC5 RRC signaling being a specific example. Alternatively, for groupcast, the transmit UE may send the SL CG configuration for reception in separate SL RRC or PC5 based RRC signaling to each destination UE. In addition, RRC signaling may be further sent to the transmitter to update or deactivate the SL CG configuration. In this case, the transmit UE may further send an update or deactivation signal of part or all of the SL CG configuration via SL RRC or PC5 based RRC signaling.

In this embodiment, since the transmit UE is receiving RRC from a BS for resource configuration, at least the transmit UE is in coverage. The receive UE (or UEs) may or may not in coverage, but it at least is in the communication range of the transmit UE.

In some embodiments, this approach is applied to Mode 1 SL configured grant.

In some embodiments, this approach is applied to Mode 2 SL transmission because the receive UE or UEs can be out of coverage.

Figure 6A:
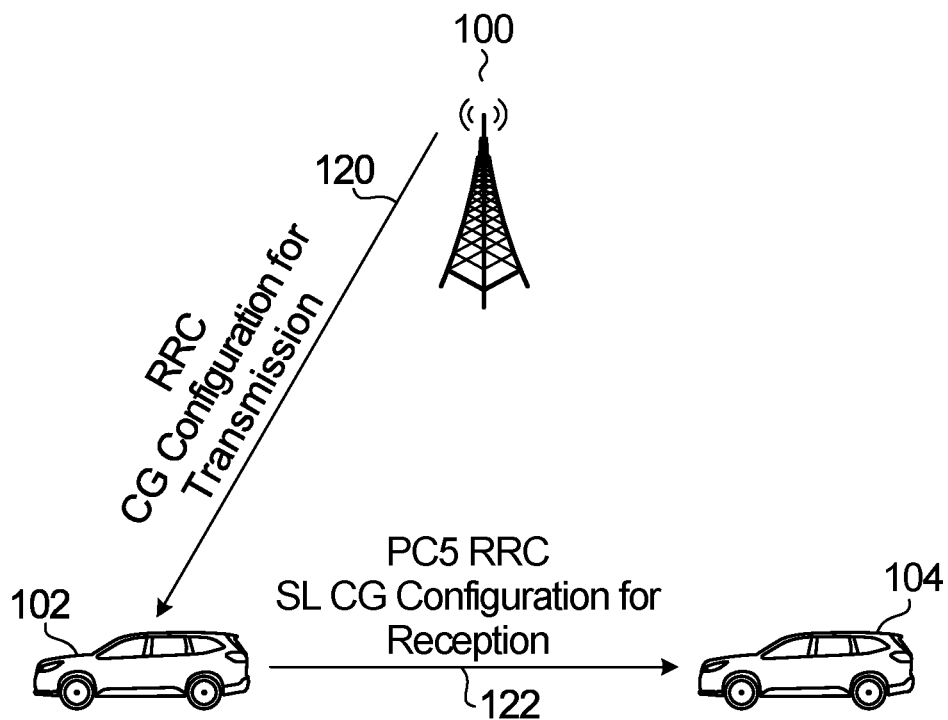
FIG. 6A is a diagram of SL CG configuration in which the network transmits SL CG to the transmit UE which in turn is forwarded on to the receive UE.

Referring to FIG. 6A, shown is a system block diagram illustrating the above-described embodiment. For FIG. 6A, and other figures described herein, the same reference numbers are used for the base station and the UEs. However, it should be understood that the network and the UEs may be configured differently for the various embodiments. In the embodiment of FIG. 6A, the BS 100 transmits a SL CG configuration at 120 to the transmit UE 102 via RRC signaling, and optionally also sends a destination ID. The UE 102 then sends at least part of the SL CG configuration at 112 to the receive UE 104 BS 100, and optionally also sends a source ID.

Figure 6B:
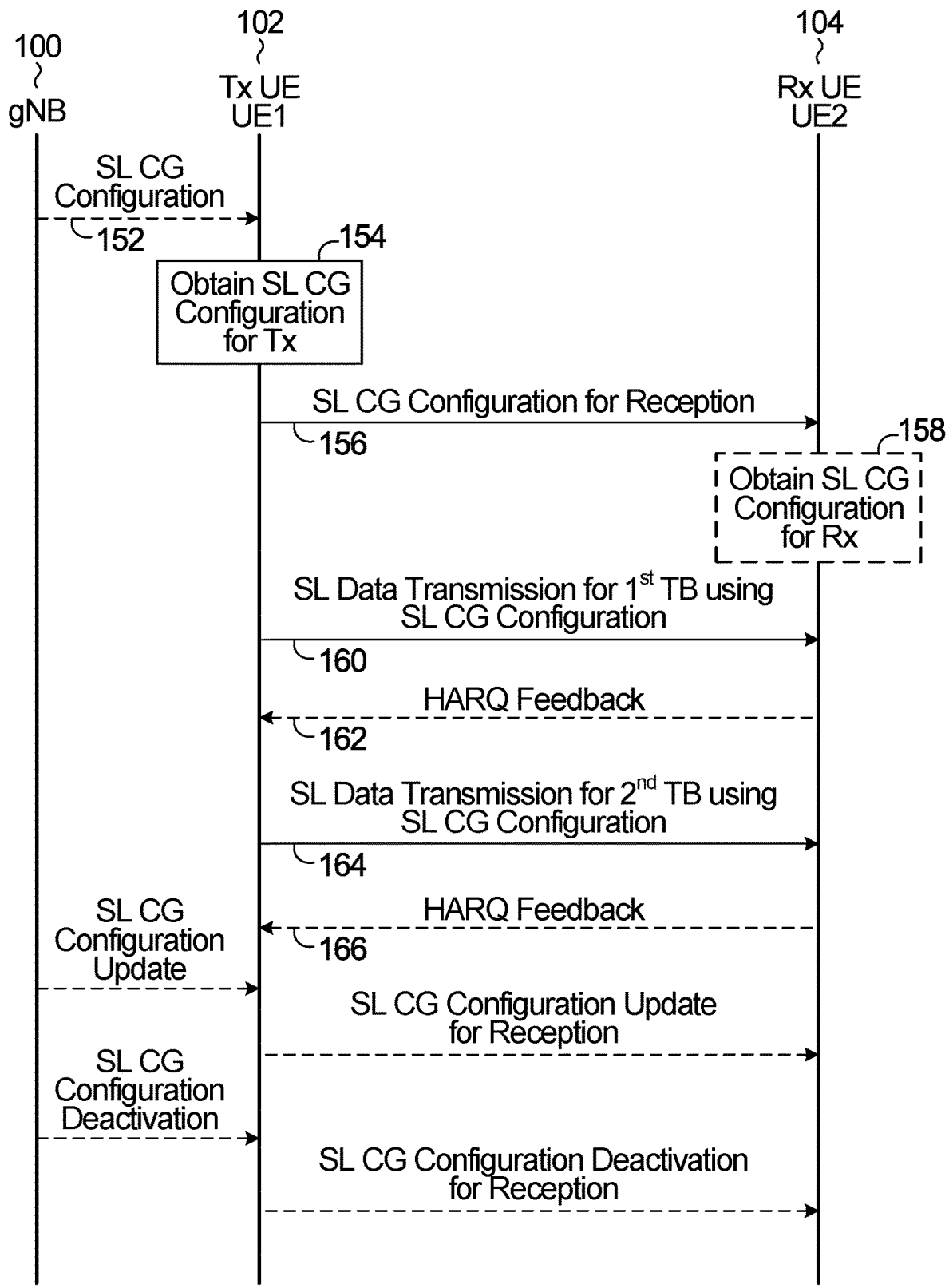
FIG. 6B is a signal diagram for the embodiment of FIG. 6A.

An example of a signal flow for this embodiment is shown in FIG. 6B, which shows transmissions between a gNB (BS) 100, transmit UE 102 and receive UE 104. The signal flow begins at 152 with the gNB 100 transmitting a SL CG configuration to the transmit UE 102 using higher layer signaling, such as RRC signaling. More generally, at 154 the transmit UE obtains the SL CG configuration, not necessarily via RRC signaling from the gNB. At 156, the transmit UE 102 sends at least part of the SL CG configuration to the receive UE 104 via higher layer signaling, shown as via SL RRC. More generally, the receive UE obtains the SL CG configuration for SL reception at 158, and this can include, for example, receiving the configuration from the network. At 160, the transmit UE 102 makes a SL data transmission of a first transport block (TB) using the SL CG configuration. Optionally, the receive UE 104 sends HARQ feedback at 162. Next, at 164, the transmit UE makes a SL data transmission of a second TB using the SL CG configuration, and optionally the receive UE 104 sends HARQ feedback at 166. There may be multiple transmissions of a TB according to the repetition configuration in SL CG configurations. More generally, multiple TBs may be transmitted by the transmit UE 102 using the SL CG configuration. In addition, RRC signaling may be further used to update or deactivate the SL CG configuration as shown in the figure. In this case, the transmit UE may further send an update or deactivation signal of SL CG configuration via SL RRC or PC5 based RRC signaling.

In some embodiments, the transmit UE may be configured or with a resource pool by the BS. The resource pool configuration may be obtained in a RRC signaling or system information (e.g. in SIB) from BS. The resource pool (RP) contains a pool of at least time frequency resources. The resource pool is usually meant to be shared by many UEs. In this case, the transmit UE selects resources and parameters for SL CG transmission among the RP. The selection may be based on random selection or it can be based on sensing or other side information, e.g. UE location. For example, resource pool may defines the total bandwidth and division/definition of frequency subchannels and optionally all the usable time slots for SL transmission. The transmit UE may select UE specific resources among the RP for SL CG transmission. The selection may be based on its data traffic, the QoS or latency requirements, the packet size, the quality of the SL channel, SL measurements and sensing results etc. For example, UE may select a periodicity, a number of subchannels, DMRS and MCS for a SL CG PSSCH transmission. UE then form a SL CG configuration according to its own selection and the RP configuration and send the SL CG configuration to the receive UE via SL or PC5 based RRC. Many examples of how sensing can be used to select the resources are provided above. Once the transmit UE selects the resource for SL CG transmission, the transmit UE sends a SL CG configuration to the receive UE for reception based on the selected resources. Similar to SCI activation embodiments in other part of the disclosure, the transmit UE may also send part or all of the SL CG configuration to the receive UE via SCI activation signal instead of SL RRC.

Embodiment: Transmit UE Sends CG to Receive UE

Similar to the previously described embodiment, in this embodiment, the transmit UE sends a SL CG configuration via higher layer signaling to the receiving UE for the reception of configured grant transmission. However, the transmit UE may not have obtained the SL CG configuration from BS.

In some embodiments, the transmit UE obtains the configured grant configuration from a preconfiguration and UE send part or all of the (pre)configured SL CG configuration to the receive UE via SL or PC5 RRC signaling. The preconfiguration may be a configuration received previously from BS in a RRC signaling or system information (e.g. in SIB). The preconfiguration may be also preconfigured in a device, by the network in advance, or hard coded into the UE. It is noted that the various options for preconfiguration that are described throughout this disclosure in the context of specific embodiments can more generally be applied for any embodiment that makes use of preconfiguration.

In some embodiments, the transmit UE may be configured or preconfigured with a resource pool. The preconfiguration may be a configuration received previously from BS in a RRC signaling or system information (e.g. in SIB). The preconfiguration may be also preconfigured in a device, by the network in advance, or the resource pool may be predefined. The resource pool (RP) contains a pool of at least time frequency resources. The resource pool is usually meant to be shared by many UEs. In this case, the transmit UE selects resources and parameters for SL CG transmission among the RP. The selection may be based on random selection or it can be based on sensing or other side information, e.g. UE location. For example, resource pool may defines the total bandwidth and division/definition of frequency subchannels and optionally all the usable time slots for SL transmission. The transmit UE may select UE specific resources among the RP for SL CG transmission. The selection may be based on its data traffic, the QoS requirements, the packet size, the quality of the SL channel based on measurements and sensing results etc. For example, UE may select a periodicity, a number of subchannels, DMRS and MCS for a SL CG PSSCH transmission. UE then form a SL CG configuration according to its own selection and the RP configuration and send the SL CG configuration to the receive UE via SL or PC5 based RRC. Many examples of how sensing can be used to select the resources are provided above. Once the transmit UE selects the resource for SL CG transmission, the transmit UE sends a SL CG configuration to the receive UE for reception based on the selected resources. Similar to SCI activation embodiments in other parts of this disclosure, the transmit UE may also send part or all of the SL CG configuration to the receive UE via SCI activation signal instead of SL RRC.

In this embodiment, both transmit UE and receive UE (UEs) can be out of coverage. Therefore, this can be used for a SL Mode 2 configured grant transmission scheme. In some other embodiments, the transmit UE may be in coverage, in which case this can be used for a SL Mode 1 transmission scheme.

Figure 7:
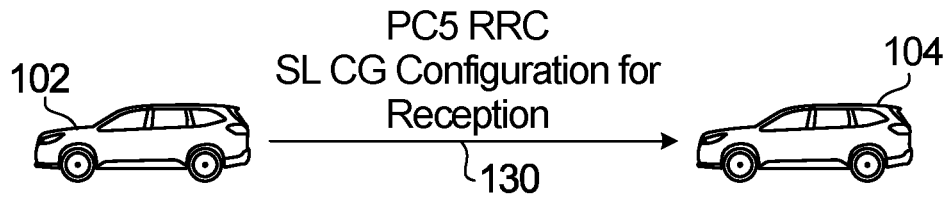
FIG. 7 is a diagram of SL CG configuration in which a transmit UE sends SL CG configuration to a receive UE.

Referring to FIG. 7, shown is a system block diagram illustrating the above-described embodiment. In the embodiment of FIG. 7, the UE 102 then sends at least part of the CG at 130 to the receive UE 104 BS 100, and optionally also sends a source ID. Referring back to the signal flow of FIG. 6A, this signal flow also applies to this embodiment, where the transmit UE obtains the SL CG configuration at 154 instead of receiving it from the network at 152.

Embodiment: Relay UE Receives CG from Network and Forwards to Another UE to Perform SL CG Transmission In this SL configured grant mode, a UE among a group of UEs receives a SL CG configuration from the network (e.g.

a gNB) for the SL CG configuration of one or multiple UEs in the UE group. For brevity, the UE that receives the SL CG configuration from the network will be referred to as a relay UE. In some embodiments, multiple different UEs may function as a relay UE at different times.

The UE group may be formed in advance. In some embodiments, the relay UE informs the gNB about group members.

The relay UE then sends all or part of the SL CG configurations to the respective group members using higher layer signaling, for example SL or PC5 RRC, via SL transmission. The relay UE may simply forward the BS's configuration without changing any of the configurations. The relay UE can send the SL CG configuration for the respective target UEs via separate SL or PC5 unicast RRC signaling. Alternatively, the relay UE may send all the SL CG configurations in a group based SL or PC5 RRC signaling to all of the target UEs. Each SL CG configuration may also be associated with a configuration destination ID that the configuration is targeting to. For example, the UE ID of UE2 may be associated with the SL CG configuration for UE2, and the UE ID of UE3 may be associated with the SL CG configuration of UE3. The configuration destination ID can be sent in the RRC link in 210 such that the relay UE or UE1 knows which UE to forward the corresponding SL CG configuration to. The configuration may further include a transmission source ID and transmission destination ID that correspond to the UE ID of the transmit UE and receive UE of the respective SL CG transmission.

Note that in this embodiment, the UE is relaying a SL CG configuration obtained from the BS to another UE. Therefore, this SL CG configuration is used by the other UE for transmission of SL data. If the SL CG configuration is used for unicast or groupcast with specific target receive UEs, the SL CG configuration sent by the BS and relayed by the relay UE may further optionally include destination ID and source ID of the SL transmission. In some embodiments, a transmit UE that receives a SL CG configuration from the relay UE may further forward at least part of SL CG configuration to the receive UE for reception of SL transmission, for example using a method similar to that of other embodiments described herein. Alternatively, the relay UE may also further forward the SL CG configuration of corresponding transmit UE directly to the receive UE for reception.

Figure 8A:
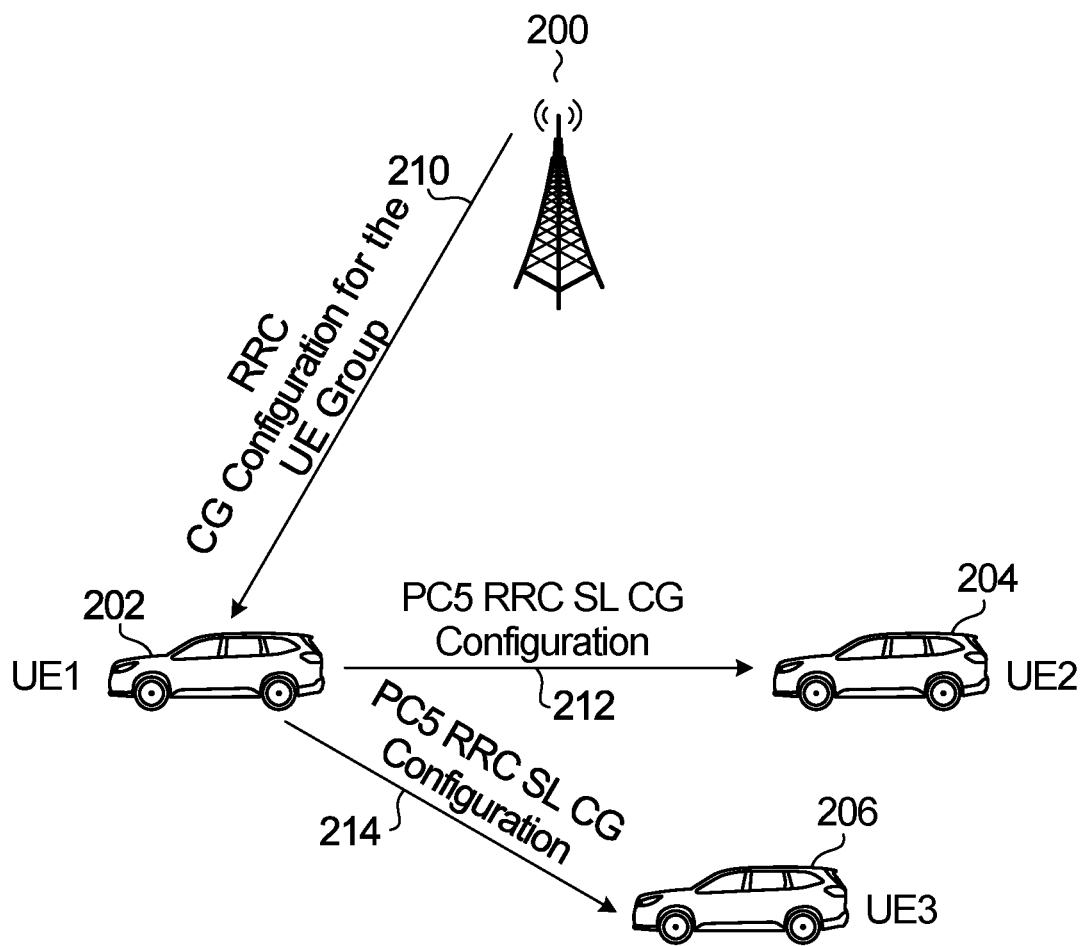
FIG. 8A is a diagram of SL CG configuration in which a network sends SL CG configuration to a first UE, for use in forwarding to other UEs to make respective sidelink transmissions.

Referring to FIG. 8A, shown is a system block diagram illustrating the above-described embodiment. In the embodiment of FIG. 8A, a BS 200 transmits a SL CG configuration at 210 to a relay UE 202 via RRC signaling. The relay UE 202 then forwards the SL CG configuration at 212,214 to transmit UEs 204,206, for use by the transmit UEs in making respective sidelink CG transmissions to receive UEs (not shown).

Figure 8B:
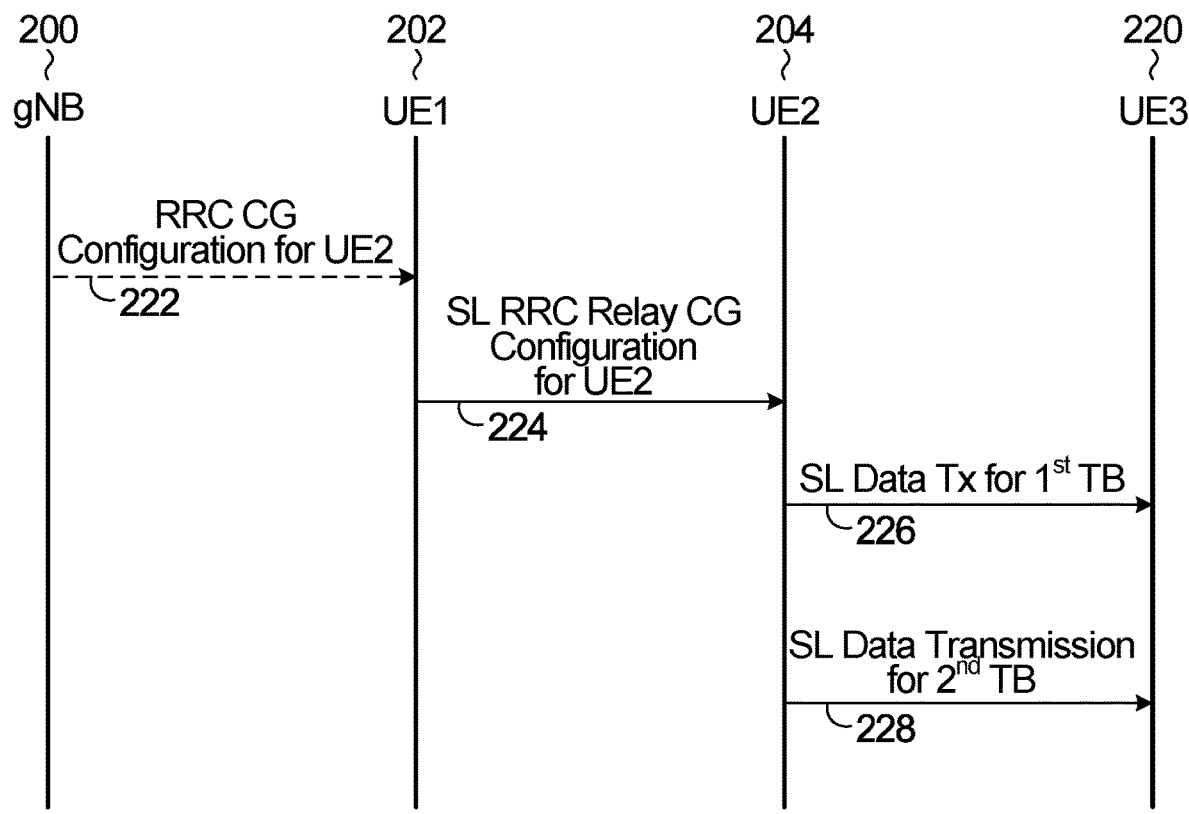
FIG. 8B is a signal diagram for the embodiment of FIG. 8A.

An example of a signal flow for this embodiment is shown in FIG. 8B, which shows transmissions between a gNB (BS) 200, relay UE 202 and transmit UE 204, and receive UE 220. The signal flow begins at 222 with the gNB 200 transmitting a SL CG configuration to the relay UE 202. At 224, the relay UE 202 sends the SL CG configuration to the transmit UE 204 via SL RRC. At 226, the transmit UE 204 makes a SL data transmission of a first transport block (TB) using the SL CG configuration to receive UE 220. Next, at 228, the transmit UE 204 makes a SL data transmission of a second TB using the SL CG configuration to receiver UE 220. More generally, multiple TBs may be transmitted by the transmit UE 204 to the receive UE 220 using the SL CG configuration. Optionally, transmit UE 204 may forward at least part of the SL CG configuration to the receive UE 220.

With the example of FIG. 8B, the relay UE forwards a SL CG configuration to a single transmit UE, but this approach can be easily generalized to a case where there are multiple transmit UEs (such as shown in FIG. 8A for example), either using respective unicast RRC for each transmit UE, or using group based signaling, for example group based PC5 RRC.
SL Higher Layer Signaling to Update or Deactivate Previous CG Configuration.

In some embodiments, PC5 RRC signaling is used to update or deactivate resource configurations.

In a first example, a UE may be previously configured with a SL CG configuration by gNB, for example by higher layer signaling (e.g. RRC signaling or system information) while the UE was in the coverage area of the gNB. The UE may subsequently go out of coverage, but remain within reach of another UE that is still in coverage. The in coverage UE may send an update on the SL CG configuration to the out of coverage UE via PC5 RRC. The in coverage UE may obtain the update from the network.

In a second example, initially both a transmit UE and a receive UE may receive SL CG configuration from the network, for example from a gNB. Subsequently, the gNB updates the SL CG configuration for the transmit UE, but not the receive UE. In this case, the transmit UE sends higher layer signaling, for example PC5 RRC, to the receive UE to update the SL CG configuration.

Embodiment: Transmit UE Selects One SL CG Configuration Out of Multiple CG Configurations to Send to Receive UE In another embodiment, the transmit UE may be configured via higher layer signaling from the network, or pre-configured, with multiple SL CG configuration. The multiple SL CG configurations may be belong to or within the same resource pool configuration or multiple resource pool configurations. The preconfiguration may be a configuration received previously from a BS via RRC signaling or system information (e.g. in SIB). The preconfiguration may be also preconfigured in the UE, by the network in advance or in the UE, or otherwise predefined. The transmit UE may select a configuration among the multiple configurations. The selection may be based on random selection or it can be based on sensing or other side information, e.g. UE location, traffic model, QoS and latency requirements, SL measurements etc. Once the transmit UE selects the configuration, it sends part or all of a selected SL CG configuration to the receive UE for reception via higher layer sidelink signaling, for example SL or PC5 RRC signaling.

All of the above-described embodiments involve sending SL CG configuration via the SL or PC5 RRC signaling or receiver UE obtaining SL CG configuration via network or BS. Then, in the cases this is used to send the SL CG configuration to a receive UE, this allows the receive UE to obtain all or part the resource and parameters for receiving the SL transmission configured by the SL CG configuration. In this case, the transmission may not need a SCI to dynamically indicate all the respective resource parameters for each SL transmission. Then, in the cases this is used to send the SL CG configuration to another transmit UE, this allows the other transmit UE to obtain the resource and parameters for transmitting a SL transmission configured by the SL CG configuration even though the other transmit UE may be out of network coverage. The receiver UE then does not need to decode SCI first in order to decode the SL data transmission. Alternatively, SCI may be still transmitted with the SL data transmission but the information included in the SCI is reduced because part of the parameters of SL CG configuration have been conveyed to the receiver via SL RRC or RRC from BS.

SCI Activation for SL Configure Grant Transmission.

In some embodiments, for Type 2 SL CG transmission, the resource is configured in a combination of higher layer signaling (e.g. RRC signaling) and layer 1 (L1) signaling (e.g. DCI signaling). The RRC signaling may include the parameter(s) that are not indicated in DCI, such as periodicity of resource. After the RRC configuration, the transmit UE may wait for a DCI activation signal from BS to activate the SL CG transmission. The DCI signal for activation may also include further information of configured grant configuration in addition to the information in RRC signaling, such as time and frequency resources, MCS etc. After receiving the activation signal, UE will have obtained all the information for SL CG configuration, and can perform SL transmissions according to the SL CG configuration. SL CG type 2 transmission may be called SL semi-persistent transmission. UE may further receive a deactivation DCI from the BS or more generally from the network, which is used to deactivate the SL CG configuration. After receiving a deactivation DCI, the UE may deactivate the SL CG configuration and not transmit SL CG transmission according to the SL CG configuration before the SL CG configuration is re-activated.

In some embodiments, the BS or the transmit UE can optionally send part or all of the SL CG configuration in the RRC signaling to the UE or UEs that are receiving the SL CG transmission. However, since the information of the SL CG configuration from DCI activation signal is not sent to the transmitter yet, the receiver will still be unaware of the SL CG configuration that is conveyed in the DCI signaling.

In some embodiments, to do the SL CG type 2 transmission such that the receiver knows the resource and parameters to decode the SL CG transmission, the transmit UE also transmits a SCI or PSCCH transmission that is associated with each SL data or PSSCH transmission. The SCI may include scheduling information or indication about the corresponding PSSCH transmission. UE may first decode the SCI and obtain the resource information used for the PSSCH transmission and then decode the PSSCH.

However, with this approach, the SCI may indicate the same information and repeat for every SL CG transmission, which introduces unnecessary overhead.

In some embodiments, a solution is provided which uses a SCI activation signal, but avoids the overhead of sending the same information for every SL CG transmission. In the first SL CG transmission, the transmit UE may send a corresponding SCI or PSCCH transmission that is associated with the first PSSCH transmission. The SCI not only indicates the scheduling information for this specific PSSCH transmission, but it also serves as an activation signal which indicates the same scheduling information will be used for the following SL CG PSSCH transmission. Alternatively, the SCI activation signal can be sent without being associated with a specific PSSCH transmission, e.g., the transmit UE can send a SCI activation signal right after receiving a DCI activation signal for SL CG transmission. After receiving a SCI activation signal, UE may not send SCI that is associated with the following SL CG PSSCH transmissions as the receiver already obtained the resource information from the SCI activation signal. When the transmit UE receives a DCI deactivation, the transmit UE may send a deactivation SCI signal to inform the receive UE the corresponding CG transmission is deactivated.

The SCI activation and deactivation method may also be applicable similarly to Type 1 SL CG configured grant. For example, instead of the BS or transmit UE sending the SL CG configuration to the receive UE for reception of CG transmission (e.g. in RRC or SL RRC signaling), the transmit UE may send a SCI activation signal to the receive UE. The receive UE obtains some or all of the SL CG configuration information from the activation SCI. And then the transmit UE may not send an SCI associated with each SL CG PSSCH transmission.

Figure 9:
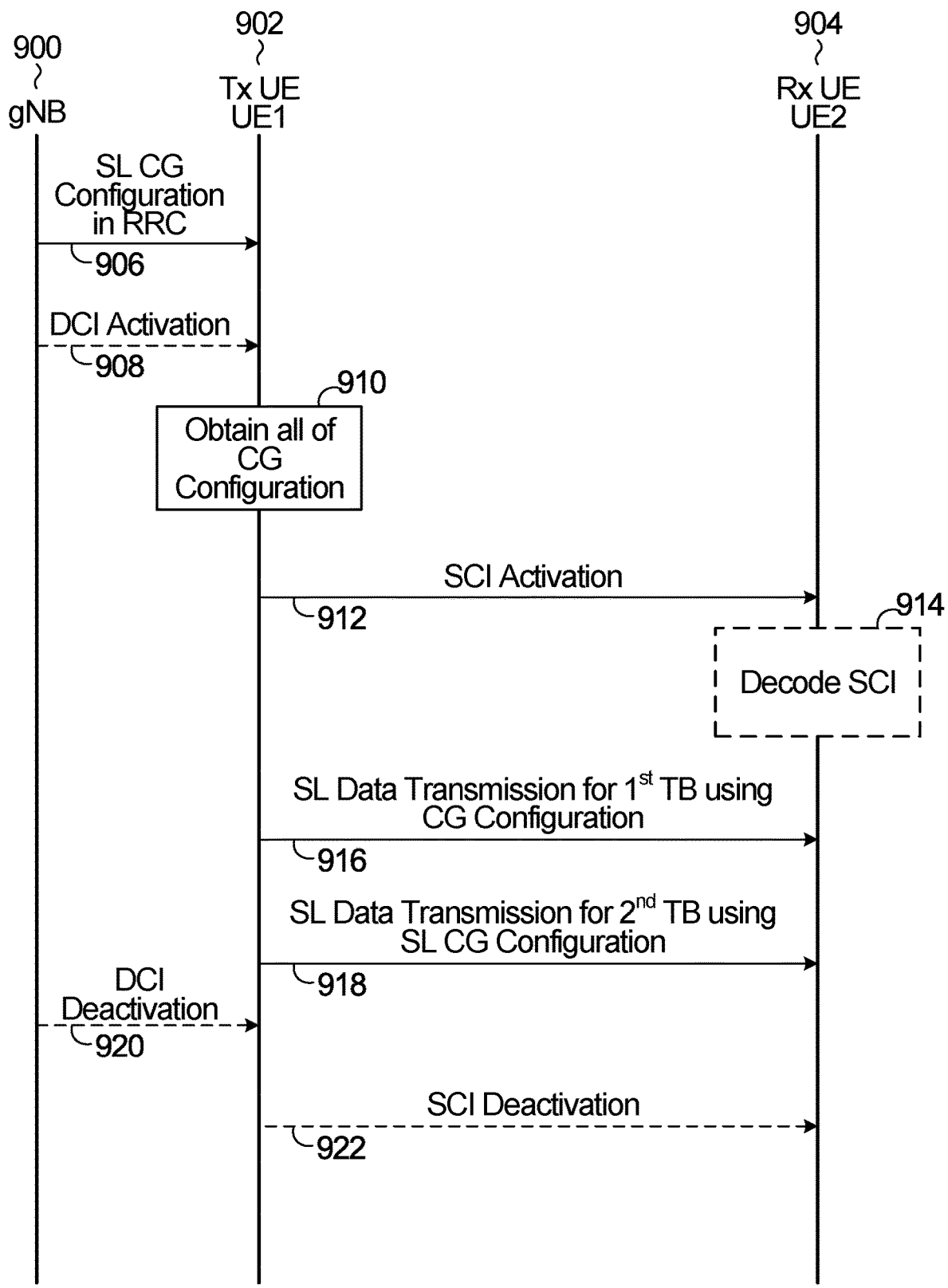
FIG. 9 is a signal flow diagram for an embodiment featuring DCI activation of an SL CG configuration.

Referring to FIG. 9, shown is a signal flow diagram for an embodiment featuring DCI activation and SCI activation of an SL CG configuration. FIG. 9 shows transmissions between a gNB (BS) 900, transmit UE 902 and receive UE 904. The signal flow begins at 90 with the gNB 900 transmitting a SL CG configuration to the transmit UE 902 using higher layer signaling, such as RRC signaling. Following this the gNB 900 activates the SL CG configuration by transmitting a DCI to the UE, referred to as DCI activation at 908. The DCI may also contain additional details/parameters of the configuration. At 910, the transmit UE will have all the information it needs to perform the SL CG transmission. The transmit UE 902 transmits an SCI to the receive UE 904, referred to as SCI activation 912. At 914, the receive UE 904 decodes the SCI and now has information necessary to receive an SL CG transmission from the transmit UE 902. Note the receive UE 904 obtains the SL CG configuration necessary to receive an SL CG transmission, either in the SCI, or in a combination of the SCI and information obtained elsewhere (not shown, for example from the transmit UE or directly from the network). After decoding the activation SCI, no further SCI is needed for further SL CG data transmission. At 916, the transmit UE 102 makes a SL data transmission of a first transport block (TB) using the SL CG configuration. Next, at 918, the transmit UE makes a SL data transmission of a second TB using the SL CG configuration. After that, the gNB 900 transmits a DCI to deactivate the SL CG configuration, referred to as DCI deactivation 920. Then the transmit UE 902 transmits an SCI to deactivate the SL CG configuration at the receive UE 904, referred to as SCI deactivation 922. More generally, any number of TB transmissions can occur between activation and deactivation.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
receiving, by a first user equipment (UE) from a base station, a sidelink configured-grant (CG) configuration, wherein the sidelink CG configuration indicates a feedback channel parameter, a number of hybrid automatic repeat request (HARQ) processes, a periodicity, an offset, a time slot, and a frequency subchannel for a plurality of repetitions for sidelink CG transmissions;
transmitting via higher-layer signaling, by the first UE to a second UE, a configuration of at least one sidelink transmission parameter, wherein the at least one sidelink transmission parameter is associated with a resource pool defined within a sidelink bandwidth part (BWP), and wherein the at least one sidelink transmission parameter comprises a reference signal (RS) parameter for receiving a sidelink RS from the second UE; and transmitting, by the first UE to the second UE, a sidelink CG transmission using the RS parameter and resources configured by the sidelink CG configuration received from the base station.

2. The method of claim 1, further comprising:
selecting, by the first UE, the configuration of the at least one sidelink transmission parameter.

3. The method of claim 1, further comprising:
receiving, the first UE, signaling from a network device indicating the configuration of the at least one sidelink transmission parameter.

4. The method of claim 1, further comprising:
transmitting, by the first UE to the second UE, at least part of the sidelink CG configuration via the higher-layer signaling, wherein the configuration of the at least one sidelink transmission parameter is part of the sidelink CG configuration,
wherein the transmitting the sidelink CG transmission comprises:
transmitting the sidelink CG transmission to the second UE using resources that are not indicated in a sidelink control information from the first UE to the second UE.

5. The method of claim 4, wherein the sidelink CG configuration selected by the first UE from a plurality of sidelink CG configurations from the base station.

6. The method of claim 4, the transmitting the CG configuration comprising:
transmitting, by the first UE to a group of receiving UEs including the second UE, the CG configuration via the higher-layer signaling.

7. The method of claim 1, wherein the higher-layer signaling is "$PC_5$" signaling or radio resource control (RRC) signaling.

8. The method of claim 1, further comprising:
before the transmitting the sidelink CG transmission, selecting, by the first UE, a transmission resource from the resource pool for the sidelink CG transmission based on sidelink control information, long-term sidelink measurement, and short-term sidelink measurement.

9. The method of claim 1, wherein the sidelink RS is a demodulation reference signal (DMRS), and wherein the RS parameter transmitted via the higher-layer signaling for receiving the DMRS from the second UE.

10. The method of claim 1, wherein the higher-layer signaling is used to update parameters in a previous CG configuration transmitted from the first UE to the second UE.

11. The method of claim 1, wherein the sidelink CG configuration further indicates at least one of following for the sidelink CG transmissions:
a time domain resource configuration including at least one of a size of time domain allocations, symbols, or a time location of each repetition of the sidelink CG transmissions,
a frequency domain resource configuration including:
a subchannel definition of a starting resource block (RB) or an ending RB, and a size of a subchannel in terms of a number of RBs of the sidelink CG transmissions,
a starting location and a size of the sidelink CG transmissions, and
a frequency hopping information or frequency subchannel index of each repetition of the sidelink CG transmissions,
a resource pattern or time frequency resource pattern (TFRP),
a redundancy version (RV) sequence,
a repetition number (K),
a DMRS configuration,
a modulation coding scheme (MCS) configuration,
power control parameters,
a detonation ID, or
a source ID.

12. A method comprising:
receiving via higher-layer signaling, by a first UE from a second UE, a configuration of at least one sidelink transmission parameter, wherein the configuration of the at least one sidelink transmission parameter is based on a sidelink configured-grant (CG) configuration from a base station to the second UE, wherein the sidelink CG configuration indicates a feedback channel parameter, a number of hybrid automatic repeat request (HARQ) processes, a periodicity, an offset, a time slot, and a frequency subchannel for a plurality of repetitions for sidelink CG transmissions, wherein the at least one sidelink transmission parameter is associated with a resource pool defined within a sidelink bandwidth part (BWP), and wherein the at least one sidelink transmission parameter comprises a reference signal (RS) parameter for transmitting a sidelink RS by the first UE; and
receiving, by the first UE from the second UE, a sidelink CG transmission using the RS parameter over resources configured by the sidelink CG configuration.

13. The method of claim 12, further comprising:
receiving, by the first UE from the second UE, at least part of the sidelink CG configuration via the higher-layer signaling, wherein the configuration of the at least one sidelink transmission parameter is part of the sidelink CG configuration,
wherein the receiving the sidelink CG transmission comprises:
receiving the sidelink CG transmission from the second UE using resources that are not indicated in a sidelink control information from the second UE to the first UE.

14. The method of claim 12, wherein the higher-layer signaling is "$PC_5$" signaling or radio resource control (RRC) signaling.

15. A user equipment (UE) comprising:
at least one processor; and
a non-transitory computer-readable medium having instructions stored thereon that, when executed by the at least one processor, cause the UE to:
receive, from a base station, a sidelink configured-grant (CG) configuration, wherein the sidelink CG configuration indicates a feedback channel parameter, a number of hybrid automatic repeat request (HARQ) processes, a periodicity, an offset, a time slot, and a frequency subchannel for a plurality of repetitions for sidelink CG transmissions;
transmit via higher-layer signaling, to a second UE, a configuration of at least one sidelink transmission parameter, wherein the at least one sidelink transmission parameter is associated with a resource pool defined within a sidelink bandwidth part (BWP), and wherein the at least one sidelink transmission parameter comprises a reference signal (RS) parameter for receiving a sidelink RS reference signal from the second UE; and
transmit, to the second UE, a sidelink CG transmission using the RS parameter and resources configured by the sidelink CG configuration received from the base station.

16. The UE of claim 15, the instructions, when executed by the at least one processor, cause the UE to:
    select the configuration of the at least one sidelink transmission parameter.

17. The UE of claim 15, the instructions, when executed by the at least one processor, cause the UE to:
    receive signaling from a network device indicating the configuration of the at least one sidelink transmission parameter.

18. The UE of claim 15, the instructions, when executed by the at least one processor, cause the UE to:
    transmit, to the second UE, at least part of the sidelink CG configuration via the higher-layer signaling, wherein the configuration of the at least one sidelink transmission parameter is part of the sidelink CG configuration,
    wherein the UE transmits the sidelink CG transmission by transmitting the sidelink CG transmission to the second UE using resources that are not indicated in a sidelink control information from the UE to the second UE.

19. The UE of claim 15, wherein the higher-layer signaling is "$PC_5$" signaling or radio resource control (RRC) signaling.

20. A user equipment (UE) comprising:
    at least one processor; and
    a non-transitory computer-readable medium having instructions stored thereon that, when executed by the at least one processor, cause the UE to:
    receive via higher-layer signaling, from a second UE, a configuration of at least one sidelink transmission parameter, wherein the configuration of the at least one sidelink transmission parameter is based on a sidelink configured-grant (CG) configuration from a base station to the second UE, wherein the sidelink CG configuration indicates a feedback channel parameter, a number of hybrid automatic repeat request (HARQ) processes, a periodicity, an offset, a time slot, and a frequency subchannel for a plurality of repetitions for sidelink CG transmissions, wherein the at least one sidelink transmission parameter is associated with a resource pool defined within a sidelink bandwidth part (BWP), and wherein the at least one sidelink transmission parameter comprises a reference signal (RS) parameter for transmitting a sidelink RS by the UE; and
    receive, from the second UE, a sidelink CG transmission using the RS parameter over resources configured by the sidelink CG configuration.

21. The UE of claim 20, the instructions, when executed by the at least one processor, cause the UE to:
    receive, the second UE, at least part of the sidelink CG configuration via the higher-layer signaling, wherein the configuration of the at least one sidelink transmission parameter is part of the sidelink CG configuration,
    wherein the UE receives the sidelink CG transmission by receiving the sidelink CG transmission from the second UE using resources that are not indicated in a sidelink control information from the second UE to the UE.

22. The UE of claim 20, wherein the higher-layer signaling is "$PC_5$" signaling or radio resource control (RRC) signaling.

* * * * *